United States Patent
Zhou

(10) Patent No.: US 11,646,831 B2
(45) Date of Patent: May 9, 2023

(54) HYBRID AUTOMATIC REPEAT FEEDBACK METHOD AND DEVICE

(71) Applicant: Beijing Xiaomi Mobile Software Co., Ltd., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 408 days.

(21) Appl. No.: 17/059,681

(22) PCT Filed: Jun. 1, 2018

(86) PCT No.: PCT/CN2018/089597
§ 371 (c)(1),
(2) Date: Nov. 30, 2020

(87) PCT Pub. No.: WO2019/227476
PCT Pub. Date: Dec. 5, 2019

(65) Prior Publication Data
US 2021/0211240 A1    Jul. 8, 2021

(51) Int. Cl.
*H04L 1/18* (2023.01)
*H04W 72/04* (2023.01)
*H04L 1/1812* (2023.01)
*H04L 1/1867* (2023.01)
*H04W 72/0446* (2023.01)
(Continued)

(52) U.S. Cl.
CPC .......... *H04L 1/1819* (2013.01); *H04L 1/1887* (2013.01); *H04L 1/1896* (2013.01); *H04W 72/0446* (2013.01); *H04W 72/0453* (2013.01); *H04W 72/23* (2023.01)

(58) Field of Classification Search
CPC ... H04L 1/1819; H04L 1/1887; H04L 1/1896; H04W 72/23; H04W 72/0446; H04W 72/0453
See application file for complete search history.

(56) References Cited

U.S. PATENT DOCUMENTS

2016/0105907 A1    4/2016  Lee

FOREIGN PATENT DOCUMENTS

| CN | 101414897 A | 4/2009 |
| CN | 103986551 A | 8/2014 |
| CN | 106130701 A | 11/2016 |

(Continued)

OTHER PUBLICATIONS

Notification to Grant Patent Right for Invention for Chinese Application No. 201880000713.4, dated Mar. 26, 2021.
(Continued)

*Primary Examiner* — Melvin C Marcelo
(74) *Attorney, Agent, or Firm* — Finnegan, Henderson, Farabow, Garrett & Dunner, L.L.P.

(57) ABSTRACT

The present invention relates to a hybrid automatic repeat feedback method and a device. The method includes: detecting whether a time-domain resource corresponding to an ACK/NACK signal and configured by a system has an ACK/NACK signal; if an ACK/NACK signal is not detected, sending a feedback scheduling message to user equipment to instruct the user equipment to send an ACK/NACK signal, the ACK/NACK signal corresponding to all downlink transmission resources that do not feed back any ACK/NACK.

19 Claims, 15 Drawing Sheets

(51) Int. Cl.
*H04W 72/0453* (2023.01)
*H04W 72/23* (2023.01)

(56) References Cited

FOREIGN PATENT DOCUMENTS

| CN | 107734653 A | 2/2018 | |
|---|---|---|---|
| WO | WO-2009052745 A1 * | 4/2009 | ........... H04L 1/1607 |
| WO | WO 2018/050205 A1 | 3/2018 | |

OTHER PUBLICATIONS

Ericsson , "Summary of URLLC contributions", 3GPP TSG RAN WG1 Meeting#93 R1-1807663, Busan, South Korea, May 21-25, 2018, 3 pages.

International Search Report in International Application No. PCT/CN2018/089597, dated Feb. 13, 2019.

English translation of Written Opinion of International Search Authority in the International Application No. PCT/CN2018/089597, dated Feb. 13, 2019.

First Office Action of Chinese Application No. 201880000713.4, dated Aug. 25, 2020.

* cited by examiner

| S0 | S1 | S2 | S3 | S4 | S5 | S6 | S7 | S8 | S9 | S10 | S11 | S12 | S13 |
|----|----|----|----|----|----|----|----|----|----|-----|-----|-----|-----|
| Dc | Dd | Dd | Dd | Dd | Dd | Dd | Dd | Dd | Dd | Dd  | Dd  | GP  | Uc  |

HYBRID AUTOMATIC REPEAT FEEDBACK METHOD AND DEVICE

CROSS REFERENCE TO RELATED APPLICATIONS

This application is a national phase application based on International Application No. PCT/CN2018/089597, filed Jun. 1, 2018, the content of which is incorporated herein by reference.

TECHNICAL FIELD

The present disclosure generally relates to the technical field of communication, and more particularly, to a hybrid automatic repeat feedback control method and device.

BACKGROUND

In related art, 5th-generation (5G) new radio (NR) is applied to an unlicensed band. The unlicensed band may also be occupied by another system (for example, a wireless fidelity (WiFi) system). User equipment may receive downlink data sent by a base station in the unlicensed band and feed back an acknowledgement (ACK)/negative acknowledgement (NACK) signal to the base station. Since the unlicensed band may be occupied by another system, there is yet no effective solution for how to feed back an ACK/NACK signal.

SUMMARY

Embodiments of the present disclosure provide a hybrid automatic repeat feedback control method and device. The technical solutions are implemented as follows.

According to a first aspect of embodiments of the present disclosure, a hybrid automatic repeat feedback control method is provided, which may be applied to a base station side and include: whether there is an ACK/NACK signal on a time-frequency resource configured by a system and corresponding to the ACK/NACK signal is monitored; in response to no ACK/NACK signal being detected, a feedback scheduling message is sent to user equipment to instruct the user equipment to send the ACK/NACK signal, and the ACK/NACK signal relates to all downlink transmission resources that do not feed back any ACK/NACK.

The technical solution provided in the embodiment of the present disclosure may have the following beneficial effect: the embodiment provides a scheduling mechanism for the ACK/NACK signal, and a base station, in response to no ACK/NACK signal being detected, may send the feedback scheduling message to the user equipment to provide an opportunity of sending the ACK/NACK signal for the user equipment, such that the phenomenon that the base station repeatedly sends downlink data is reduced, network resources are saved, and the data delay may also be reduced.

In an embodiment, the feedback scheduling message without scheduling information may be configured to instruct the user equipment to report the ACK/NACK signal on a next time-frequency resource configured by the system and corresponding to the ACK/NACK signal; or the feedback scheduling message with scheduling information may be configured to instruct the user equipment to report the ACK/NACK signal on a time-frequency resource indicated by the scheduling information.

The technical solution provided in the embodiment of the disclosure may have the following beneficial effect: in the embodiment, multiple formats may be adopted for the feedback scheduling message, one is without scheduling information, namely the user equipment is instructed to report the ACK/NACK signal by use of the time-frequency resource configured by the system by default; and the other is with scheduling information, and the time-frequency resource required by reporting the ACK/NACK signal may be configured flexibly. The embodiment is applied to multiple application scenarios.

In an embodiment, the operation that the feedback scheduling message is sent to the user equipment in response to no ACK/NACK signal being detected may include: in response to no ACK/NACK signal being detected, a timer is started; and after the timer expires, the feedback scheduling message is sent to the user equipment.

The technical solution provided in the embodiment of the present disclosure may have the following beneficial effect: in the embodiment, the base station, in response to no ACK/NACK signal being detected, may wait for a period of time and tolerate a certain network transmission delay, and then sends the feedback scheduling message to the user equipment.

In an embodiment, the operation that the feedback scheduling message is sent to the user equipment in response to no ACK/NACK signal being detected may include: in response to no ACK/NACK signal being detected, whether the number of times to transmit the feedback scheduling message reaches a preset number threshold is determined; and in response to the preset number threshold not being reached, the feedback scheduling message is sent to the user equipment.

The technical solution provided in the embodiment of the present disclosure may have the following beneficial effect: in the embodiment, the number of times to transmit the feedback scheduling message is limited, and network resources occupied by frequent sending of the feedback scheduling message are reduced.

In an embodiment, the operation that the feedback scheduling message is sent to the user equipment may include: the feedback scheduling message is sent to the user equipment through downlink control signaling.

The technical solution provided in the embodiment of the present disclosure may have the following beneficial effect: in the embodiment, a time-frequency resource required by sending the feedback scheduling message is provided.

In an embodiment, the method may further include: the ACK/NACK signal reported by the user equipment is received.

The technical solution provided in the embodiment of the present disclosure may have the following beneficial effect: in the embodiment, the base station may receive the ACK/NACK signal reported by the user equipment.

In an embodiment, the reported ACK/NACK signal may include multiple bits, one bit corresponding to a group of downlink transmission resources that do not feed back any ACK/NACK and the multiple bits corresponding to all the downlink transmission resources that do not feed back any ACK/NACK; or the reported ACK/NACK signal may include one bit, the bit corresponding to all the downlink transmission resources that do not feed back any ACK/NACK.

The technical solution provided in the embodiment of the present disclosure may have the following beneficial effect: in the embodiment, multiple representation forms are provided for the ACK/NACK signal, one is a form including multiple bits, and this form is relatively accurate in representation; and the other is a form including one bit, and in this form, a length of the ACK/NACK signal is reduced, namely network resources are saved.

In an embodiment, the method may further include: a downlink transmission resource range that corresponds to the ACK/NACK signal reported by the user equipment and does not feed back any ACK/NACK is received.

The technical solution provided in the embodiment of the present disclosure may have the following beneficial effect: in the embodiment, the base station may also receive the downlink transmission resource range, such that the base station may clearly learn about specific downlink data received by the user equipment and downlink data that is not received.

According to a second aspect of embodiments of the present disclosure, a hybrid automatic repeat feedback control method is provided, which may be applied to a user equipment side and include: a feedback scheduling message sent by a base station is received; an ACK/NACK signal is fed back to the base station according to the feedback scheduling message, and the ACK/NACK signal relates to all downlink transmission resources that do not feed back any ACK/NACK.

The technical solution provided in the embodiment of the present disclosure may have the following beneficial effect: in the embodiment, user equipment may receive and parse the feedback scheduling message and then feed back the ACK/NACK signal to the base station according to an instruction of the feedback scheduling message, and the ACK/NACK signal relates to all the downlink transmission resources that do not feed back any ACK/NACK. In such a manner, missing reporting of ACK/NACK signals may be reduced, the base station may conveniently and timely know about a downlink data receiving condition of the user equipment, and the probability that the base station repeatedly sends downlink data may be reduced.

In an embodiment, before the operation that the feedback scheduling message sent by the base station is received, the method may further include: whether a time-frequency resource configured by a system and corresponding to the ACK/NACK signal is occupied is monitored; and in response to monitoring that the time-frequency resource configured by the system and corresponding to the ACK/NACK signal is occupied, the ACK/NACK signal which needs to be sent is recorded.

The technical solution provided in the embodiment of the present disclosure may have the following beneficial effect: in the embodiment, the user equipment, when not timely reporting the ACK/NACK signal, records the present ACK/NACK signal which needs to be sent for subsequent sending, such that the probability of missing sending of the ACK/NACK signal is reduced.

In an embodiment, the operation that the ACK/NACK signal which needs to be sent is recorded may include: a corresponding relationship between the ACK/NACK signal which needs to be sent and all the downlink transmission resources that do not feed back any ACK/NACK is recorded.

The technical solution provided in the embodiment of the present disclosure may have the following beneficial effect: in the embodiment, the corresponding relationship between the ACK/NACK signal which needs to be sent and all the downlink transmission resources that do not feed back any ACK/NACK is recorded, such that subsequent provision of a downlink transmission resource range that does not feed back any ACK/NACK for the base station is facilitated, and the base station may conveniently learn about the downlink data receiving condition of the user equipment more accurately.

In an embodiment, the method may further include: after the ACK/NACK signal which needs to be sent is recorded, in response to the feedback scheduling message sent by the base station not being received in a preset time length range, the recorded ACK/NACK signal which needs to be sent is cleared.

The technical solution provided in the embodiment of the present disclosure may have the following beneficial effect: in the embodiment, a record clearing mechanism is provided, such that a cache space occupied by recorded information is saved.

In an embodiment, the fed back ACK/NACK signal may include multiple bits, one bit corresponding to a group of downlink transmission resources that do not feed back any ACK/NACK and the multiple bits corresponding to all the downlink transmission resources that do not feed back any ACK/NACK; or the fed back ACK/NACK signal may include one bit, the bit corresponding to all the downlink transmission resources that do not feed back any ACK/NACK.

The technical solution provided in the embodiment of the present disclosure may have the following beneficial effect: in the embodiment, multiple representation forms are provided for the ACK/NACK signal, one is a form including multiple bits, and this form is relatively accurate in representation; and the other is a form including one bit, and in this form, a length of the ACK/NACK signal is reduced, namely network resources are saved.

In an embodiment, in response to the fed back ACK/NACK signal including one bit, the bit may be obtained by performing AND-OR calculation on multiple bits, one bit in the multiple bits corresponding to a group of downlink transmission resources that do not feed back any ACK/NACK.

The technical solution provided in the embodiment of the present disclosure may have the following beneficial effect: in the embodiment, an algorithm for saving bits is provided, namely an implementation manner for saving bits is provided.

In an embodiment, the operation that the feedback scheduling message sent by the base station is received may include: the feedback scheduling message sent by the base station is received through downlink control signaling.

The technical solution provided in the embodiment of the present disclosure may have the following beneficial effect: in the embodiment, the user equipment may receive the feedback scheduling message sent by the base station through the downlink control signaling to facilitate reception of the user equipment.

In an embodiment, the feedback scheduling message may include no scheduling information, and the operation that the ACK/NACK signal is fed back to the base station may include: the ACK/NACK signal is fed back to the base station on a next time-frequency resource configured by the system and corresponding to the ACK/NACK signal.

Or, the feedback scheduling message may include scheduling information, and the operation that the ACK/NACK signal is fed back to the base station may include: the ACK/NACK signal is fed back to the base station on a time-frequency resource indicated by the scheduling information.

The technical solution provided in the embodiment of the disclosure may have the following beneficial effect: in the embodiment, multiple formats may be adopted for the feedback scheduling message, one is without scheduling information, namely the user equipment is instructed to report the ACK/NACK signal by use of the time-frequency resource configured by the system by default; and the other is with scheduling information, and the time-frequency resource required by reporting the ACK/NACK signal may be configured flexibly. The embodiment is applied to multiple application scenarios.

In an embodiment, the method may further include: a downlink transmission resource range that corresponds to the ACK/NACK signal and does not feed back any ACK/NACK is fed back to the base station.

The technical solution provided in the embodiment of the present disclosure may have the following beneficial effect: in the embodiment, the user equipment may also report the downlink transmission resource range, such that the base station may clearly learn about specific downlink data received by the user equipment and downlink data that is not received.

According to a third aspect of embodiments of the present disclosure, a hybrid automatic repeat feedback control device is provided, which may include: a monitoring module, configured to monitor whether there is an ACK/NACK signal on a time-frequency resource configured by a system and corresponding to the ACK/NACK signal; and a sending module, configured to, in response to no ACK/NACK signal being detected, send a feedback scheduling message to user equipment to instruct the user equipment to send the ACK/NACK signal. The ACK/NACK signal relates to all downlink transmission resources that do not feed back any ACK/NACK.

In an embodiment, the feedback scheduling message without scheduling information may be configured to instruct the user equipment to report the ACK/NACK signal on a next time-frequency resource configured by the system and corresponding to the ACK/NACK signal; or the feedback scheduling message with scheduling information may be configured to instruct the user equipment to report the ACK/NACK signal on a time-frequency resource indicated by the scheduling information.

In an embodiment, the sending module may include: a timing submodule, configured to, in response to no ACK/NACK signal being detected, start a timer; and a first sending submodule, configured to, after the timer expires, send the feedback scheduling message to the user equipment.

In an embodiment, the sending module may include: a determination submodule, configured to, in response to no ACK/NACK signal being detected, determine whether the number of times to transmit the feedback scheduling message reaches a preset number threshold; and a second sending submodule, configured to, in response to the preset number threshold not being reached, send the feedback scheduling message to the user equipment.

In an embodiment, the sending module may include: a third sending submodule, configured to send the feedback scheduling message to the user equipment through downlink control signaling.

In an embodiment, the device may further include: a first receiving module, configured to receive the ACK/NACK signal reported by the user equipment.

In an embodiment, the reported ACK/NACK signal may include multiple bits, one bit corresponding to a group of downlink transmission resources that do not feed back any ACK/NACK and the multiple bits corresponding to all the downlink transmission resources that do not feed back any ACK/NACK; or the reported ACK/NACK signal may include one bit, the bit corresponding to all the downlink transmission resources that do not feed back any ACK/NACK.

In an embodiment, the device may further include: a second receiving module, configured to receive a downlink transmission resource range that corresponds to the ACK/NACK signal reported by the user equipment and does not feed back any ACK/NACK.

According to a fourth aspect of embodiments of the present disclosure, a hybrid automatic repeat feedback control device is provided, which may include: a receiving module, configured to receive a feedback scheduling message sent by a base station; and a first sending module, configured to feed back an ACK/NACK signal to the base station according to the feedback scheduling message. The ACK/NACK signal relates to all downlink transmission resources that do not feed back any ACK/NACK.

In an embodiment, the device may further include: a monitoring module, configured to monitor whether a time-frequency resource configured by a system and corresponding to the ACK/NACK signal is occupied; and a recording module, configured to, in response to monitoring that the time-frequency resource configured by the system and corresponding to the ACK/NACK signal is occupied, record the ACK/NACK signal which needs to be sent.

In an embodiment, the recording module may include: a recording submodule, configured to record a corresponding relationship between the ACK/NACK signal which needs to be sent and all the downlink transmission resources that do not feed back any ACK/NACK.

In an embodiment, the device may further include: a clearing module, configured to, after the ACK/NACK signal which needs to be sent is recorded, in response to the feedback scheduling message sent by the base station not being received in a preset time length range, clear the recorded ACK/NACK signal which needs to be sent.

In an embodiment, the fed back ACK/NACK signal may include multiple bits, one bit corresponding to a group of downlink transmission resources that do not feed back any ACK/NACK and the multiple bits corresponding to all the downlink transmission resources that do not feed back any ACK/NACK; or the fed back ACK/NACK signal may include one bit, the bit corresponding to all the downlink transmission resources that do not feed back any ACK/NACK.

In an embodiment, in response to the fed back ACK/NACK signal including one bit, the bit may be obtained by performing AND-OR calculation on multiple bits, one bit in the multiple bits corresponding to a group of downlink transmission resources that do not feed back any ACK/NACK.

In an embodiment, the receiving module may include: a receiving submodule, configured to receive the feedback scheduling message sent by the base station through downlink control signaling.

In an embodiment, the feedback scheduling message may include no scheduling information, and the first sending module may include: a first sending submodule, configured to feed back the ACK/NACK signal to the base station on a next time-frequency resource configured by the system and corresponding to the ACK/NACK signal.

Or, the feedback scheduling message may include scheduling information, and the first sending module may include: a second sending submodule, configured to feed back the ACK/NACK signal to the base station on a time-frequency resource indicated by the scheduling information.

In an embodiment, the device may further include: a second sending module, configured to feed back a downlink transmission resource range that corresponds to the ACK/NACK signal and does not feed back any ACK/NACK to the base station.

According to a fifth aspect of embodiments of the present disclosure, a hybrid automatic repeat feedback control device is provided, which may include: a processor; and a memory configured to store instructions executable by the processor.

The processor may be configured to: monitor whether there is an ACK/NACK signal on a time-frequency resource configured by a system and corresponding to the ACK/NACK signal; and in response to no ACK/NACK signal being detected, send a feedback scheduling message to user equipment to instruct the user equipment to send the ACK/NACK signal. The ACK/NACK signal relates to all downlink transmission resources that do not feed back any ACK/NACK.

According to a sixth aspect of embodiments of the present disclosure, a hybrid automatic repeat feedback control device is provided, which may include: a processor; and a memory configured to store instructions executable by the processor.

The processor may be configured to perform the hybrid automatic repeat feedback control method applied to the user equipment side according to the second aspect.

According to a seventh aspect of embodiments of the present disclosure, a computer-readable storage medium is provided, in which computer instructions are stored, the instructions may be executed by a processor to implement the method applied to a base station side.

According to an eighth aspect of embodiments of the present disclosure, a computer-readable storage medium is provided, in which computer instructions are stored, the instructions may be executed by a processor to implement the method applied to a user equipment side.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In related art, 5G NR is applied to an unlicensed band. The unlicensed band may also be occupied by another system (for example, a WiFi system). Based on a hybrid automatic repeat request (HARQ) technology, user equipment may receive downlink data sent by a base station in an unlicensed band and feed back an ACK/NACK signal to the base station. However, a 5G NR system has a listen before talk (LBT) mechanism. That is, before an ACK/NACK signal is fed back, it is necessary to monitor whether a resource symbol configured by the system and required by feeding back the ACK/NACK signal is occupied. If it is not occupied, the ACK/NACK signal may be fed back. If it is occupied, feedback of the ACK/NACK signal is aborted. If the base station does not receive the ACK/NACK signal on the specified resource symbol, it is considered that downlink data that is sent before fails to be transmitted and the base station may resend the downlink data, which causes a longer delay for data transmission and wastes relatively more network resources.

For solving the problem, if the base station does not receive the ACK/NACK signal on the specified resource symbol, a feedback scheduling mechanism is added, and the base station may schedule the user equipment to send the ACK/NACK signal which needs to be sent before. In such a manner, more opportunities of reporting the ACK/NACK signal are provided for the user equipment, the base station may also timely know about a downlink data receiving condition, and the data transmission delay and additionally occupied network resources are reduced.

Figure 1:
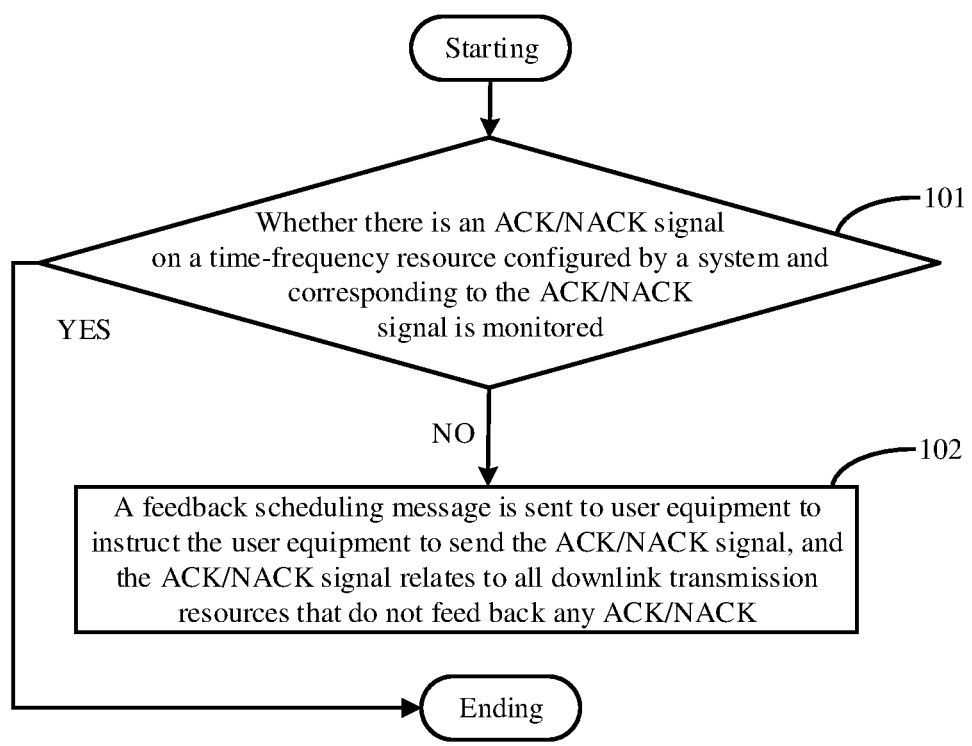
FIG. 1 is a flow chart showing a hybrid automatic repeat feedback control method, according to an exemplary embodiment.

FIG. 1 is a flow chart showing a hybrid automatic repeat feedback control method, according to an exemplary embodiment. The hybrid automatic repeat feedback control method is applied to an access network device such as a base station. As illustrated in FIG. 1, the method includes the following steps 101 to 102.

In the step 101, whether there is an ACK/NACK signal on a time-frequency resource configured by a system and corresponding to the ACK/NACK signal is monitored.

In the step 102, if no ACK/NACK signal is detected, a feedback scheduling message is sent to user equipment to instruct the user equipment to send the ACK/NACK signal, and the ACK/NACK signal relates to all downlink transmission resources that do not feed back any ACK/NACK.

If the ACK/NACK signal is monitored, the flow is ended, and an implementation solution in the related art may be adopted to implement further processing according to the received ACK/NACK signal.

Figures 2, 3:
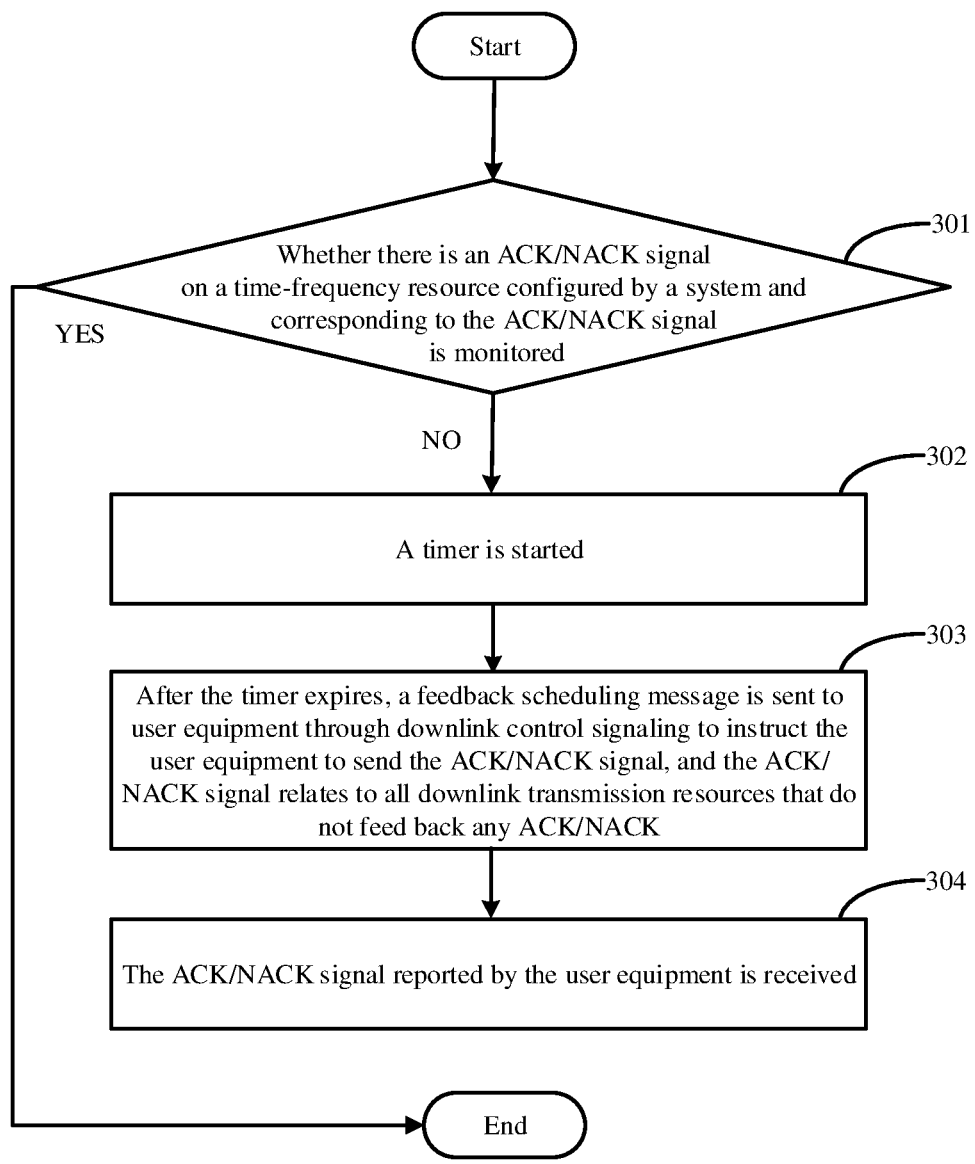
FIG. 2 is a schematic diagram illustrating a slot resource, according to an exemplary embodiment.
FIG. 3 is a flow chart showing a hybrid automatic repeat feedback control method, according to an exemplary embodiment.

In the embodiments, the system refers to a mobile communication system. The time-frequency resource configured by the system and corresponding to the ACK/NACK signal may be fixedly configured by the system, and may also be flexibly configured by a network side based on a certain reason. In the embodiments, the time-frequency resource configured by the system and corresponding to the ACK/NACK signal refers to a time-frequency resource required by the user equipment to normally report the ACK/NACK signal after receiving downlink data. For example, as illustrated in FIG. 2, a time-domain symbol S0 is a resource required by downlink control signaling (Dc), time-domain symbols S1 to S11 are resources required by downlink data (Dd), a time-domain symbol S12 is a guard period (GP), and a time-domain symbol S13 is a resource required by uplink signaling (Uc). If the system specifies that the user equipment may feed back the ACK/NACK signal on S13, S13 is the time-frequency resource configured by the system and corresponding to the ACK/NACK signal.

The base station monitors whether there is any ACK/NACK signal on S13. If no ACK/NACK signal is detected, S13 may be occupied by another system, and the user equipment cannot report the ACK/NACK signal. In such case, the base station needs to schedule the user equipment and sends the feedback scheduling message to the user equipment to instruct the user equipment to send the ACK/NACK signal. One more opportunity of sending the ACK/NACK signal is provided for the user equipment. Moreover, the ACK/NACK signal corresponds to all downlink transmission resource that do not feed back any ACK/NACK. Therefore, the base station may learn about a downlink data receiving condition of the user equipment more accurately. The base station may perform relatively accurate processing for the condition. If the user equipment feeds back an ACK, the base station does not need to retransmit the downlink data, and network resource waste is reduced. If the user equipment feeds back a NACK, the base station may timely retransmit the corresponding downlink data, and the data delay is reduced.

In the embodiments, an ACK signal and a NACK signal are represented as the ACK/NACK signal as a whole.

In an embodiment, the feedback scheduling message without scheduling information is configured to instruct the user equipment to report the ACK/NACK signal on a next time-frequency resource configured by the system and corresponding to the ACK/NACK signal.

In the embodiments, the time-frequency resource monitored by the base station in the step 101 is a present time-frequency resource. The feedback scheduling message may include no scheduling information, namely the user equipment is instructed to report the ACK/NACK signal on the next time-frequency resource configured by the system and corresponding to the ACK/NACK signal. For example, in FIG. 2, the user equipment may report the ACK/NACK signal on next S13. The reported ACK/NACK signal corresponds to two sets of downlink data of S1 to S11 and represents whether the two sets of downlink data of S1 to S11 are successfully received. For example, a set of S0 to S13 form a slot. On S13 of a slot 1, no ACK/NACK signal is detected, and the base station has sent a first set of downlink data on S1 to S11 of the slot 1. Then, the base station sends the feedback scheduling message to the user equipment. The user equipment, after receiving the feedback scheduling message, reports the ACK/NACK signal on S13 of a slot 2. In this process, the base station sends a second set of downlink data on S1 to S11 of the slot 2. Therefore, the ACK/NACK signal reported on S13 of the slot 2 corresponds to the first and second sets of downlink data, and the base station may learn about whether the user equipment successfully receives the two sets of downlink data.

In the embodiments, the length of the feedback scheduling message is reduced, and the ACK/NACK signal is reported by use of the time-frequency resource configured by the system.

Or, in an embodiment, the feedback scheduling message with scheduling information is configured to instruct the user equipment to report the ACK/NACK signal on a time-frequency resource indicated by the scheduling information.

In the embodiments, the base station may modify a certain time-frequency resource originally for downlink data transmission to a time-frequency resource for uplink signaling transmission. The modified time-frequency resource is represented by the scheduling information and notified to the user equipment. The user equipment reports the ACK/NACK signal on the time-frequency resource. For example, on S13 of the slot 1, no ACK/NACK signal is detected, and the base station has sent the first set of downlink data on S1 to S11 of the slot 1. Then, the base station sends the feedback scheduling message to the user equipment, the scheduling information in the feedback scheduling message being S5. The user equipment reports the ACK/NACK signal on S5 of the slot 2. In this process, the base station sends the second set of downlink data on S1 to S4 of the slot 2. Therefore, the ACK/NACK signal reported on S5 of the slot 2 corresponds to the first and second sets of downlink data of S1 to S11 of the slot 1 and S1 to S4 of the slot 2, and the base station may learn about whether the user equipment successfully receives the two sets of downlink data. Of course, the reported ACK/NACK signal may only correspond to the downlink data of S1 to S11 of the slot 1 because, normally speaking, the user equipment may report an ACK/NACK signal again on S13 of the slot 2, the ACK/NACK signal corresponding to the set of downlink data of S1 to S11 of the slot 2.

In the embodiments, the scheduling information is added to the feedback scheduling message, such that the time-frequency resource for reporting the ACK/NACK signal may be configured flexibly, and the user equipment may report the ACK/NACK signal timely.

In an embodiment, the step 102 includes step A1 to step A2.

In the step A1, if no ACK/NACK signal is detected, a timer is started.

In the step A2, after the timer expires, the feedback scheduling message is sent to the user equipment.

In the embodiments, the timer may time by the millisecond and may also time by the number of slot symbols. For example, an expiration threshold of the timer is set to be about 3 time slots.

The base station, when no ACK/NACK signal is detected, may send the feedback scheduling message immediately. However, there may be a delay for network transmission. In the embodiments, the base station, if no ACK/NACK signal is detected, starts the timer and after the timer expires, sends the feedback scheduling message to the user equipment. That is, the base station, if no ACK/NACK signal is detected, may wait for a period of time, and if still receiving no ACK/NACK signal, resends the feedback scheduling message. A certain network transmission delay may be tolerated, a sending frequency of the feedback scheduling message may also be reduced, and network resources are saved.

In an embodiment, the step 102 includes step B1 to step B2.

In the step B1, if no ACK/NACK signal is detected, whether the number of times to transmit the feedback scheduling message reaches a preset number threshold is determined.

In the step B2, when the preset number threshold is not reached, the feedback scheduling message is sent to the user equipment.

In the embodiments, a number is increased by 1 every time when the base station sends the feedback scheduling message. After the base station sends the feedback scheduling message, a time-frequency resource on which the user equipment reports the ACK/NACK signal again may be reoccupied, such that the base station may need to send the feedback scheduling message for many times. In the embodiments, the number of times to transmit the feedback scheduling message of the base station is limited through the number threshold (for example, 2), network resources consumed in frequently sending the feedback scheduling message are reduced. The base station, after receiving the ACK/NACK signal, may clear the recorded number.

In an embodiment, the step 102 includes step C.

In the step C, the feedback scheduling message is sent to the user equipment through downlink control signaling.

In the embodiments, the feedback scheduling message is a type of downlink control signaling, such that the feedback scheduling message needs to be sent on a time-frequency resource where the downlink control signaling is located.

For example, in FIG. 2, the time-frequency resource where the downlink control signaling is located is S0, such that the base station sends the feedback scheduling message on S0.

As an implementation mode, the base station sends the feedback scheduling message on closest S0 after no ACK/NACK signal is detected. For example, if the base station detects no ACK/NACK signal on S13 of the slot 1, the base station sends the feedback scheduling message immediately on S0 of the slot 2. In this implementation mode, there is hardly a delay.

Another implementation mode is combined with the step A1 and the step A2, and the feedback scheduling message is sent on closest S0 after expiration of the timer. For example, the base station detects no ACK/NACK signal on S13 of the slot 1, and the timer starts timing. Then, the timer expires on S3 of the slot 2, and the base station sends the feedback scheduling message on S0 of a slot 3.

In an embodiment, the method further includes step D.

In the step D, the ACK/NACK signal reported by the user equipment is received.

In the embodiments, the user equipment may report the ACK/NACK signal according to the feedback scheduling message. The base station may monitor and receive the ACK/NACK signal reported by the user equipment on the time-frequency resource indicated by the feedback scheduling message. The ACK/NACK signal reported by the user equipment may be received on the time-frequency resource configured by the system or the time-frequency resource indicated by the scheduling information.

In an embodiment, the reported ACK/NACK signal includes multiple bits, one bit corresponding to a group of downlink transmission resources that do not feed back any ACK/NACK and the multiple bits corresponding to all the downlink transmission resources that do not feed back any ACK/NACK.

In the embodiments, the ACK signal may be represented by a bit valued to be 1, and the NACK signal may be represented by a bit valued to be 0. One bit corresponds to a group of downlink transmission resources that do not feed back any ACK/NACK, and the group of downlink transmission resources that do not feed back any ACK/NACK may be a downlink transmission resource (for example, S3) of a slot symbol, may also be downlink transmission resources (for example, S1 to S11) of a slot, and may also be downlink transmission resources (for example, S1 to S5) of a variable number of multiple slot symbols, etc. A downlink transmission resource range corresponding to a group of downlink transmission resources that do not feed back any ACK/NACK may be configured flexibly and may also be determined according to a practical requirement.

Following the above example, the user equipment reports the ACK/NACK signal on S13 of the slot 2. The reported ACK/NACK signal includes two bits, a value of the first bit represents whether the first set of downlink data sent on S1 to S11 of the slot 1 is successfully received, and a value of the second bit represents whether the first set of downlink data sent on S1 to S11 of the slot 2 is successfully received.

For another example, the user equipment reports the ACK/NACK signal on S5 of the slot 2. The reported ACK/NACK signal includes two bits, a value of the first bit represents whether the first set of downlink data sent on S1 to S11 of the slot 1 is successfully received, and a value of the second bit represents whether the first set of downlink data sent on S1 to S4 of the slot 2 is successfully received.

For another example, the user equipment reports the ACK/NACK signal on S5 of the slot 2. The reported ACK/NACK signal includes one bit, and a value of the bit represents whether the first set of downlink data sent on S1 to S11 of the slot 1 is successfully received.

In the embodiments, the ACK/NACK signal may include multiple bits, such that the downlink data receiving condition may be reflected more accurately.

Or, in an embodiment, the reported ACK/NACK signal includes one bit, the bit corresponding to all the downlink transmission resources that do not feed back any ACK/NACK.

In the embodiments, the ACK signal may be represented by a bit valued to be 1, and the NACK signal may be represented by a bit valued to be 0. One bit corresponds to a group of downlink transmission resources that do not feed back any ACK/NACK, and the group of downlink transmission resources that do not feed back any ACK/NACK may be a downlink transmission resource (for example, S3) of a slot symbol, may also be downlink transmission resources (for example, S1 to S11) of a slot, and may also be downlink transmission resources (for example, S1 to S5) of a variable number of multiple slot symbols, etc. A downlink transmission resource range corresponding to a group of downlink transmission resources that do not feed back any ACK/NACK may be configured flexibly and may also be determined according to a practical requirement.

The reported ACK/NACK signal includes only one bit, and a value of the bit is obtained by performing calculation on multiple bits corresponding to multiple groups of downlink transmission resources that do not feed back any ACK/NACK. If multiple sets of downlink data are successfully received, the value of the bit is 1, and if at least one set of downlink data is not successfully received, the value of the bit is 0. That is, the reported 1-bit ACK/NACK signal corresponds to all the downlink transmission resources that do not feed back any ACK/NACK. When the value of the bit is 0, all the multiple sets of downlink data need to be resent.

The embodiments may be combined with the above embodiment, namely the reported ACK/NACK signal includes multiple bits, and a value of at least one bit in the multiple bits may be obtained by calculation.

In the embodiments, a calculation manner is adopted, such that the length of the reported ACK/NACK signal may be reduced, and network resources are saved.

In an embodiment, the method further includes step E.

In the step E, a downlink transmission resource range that corresponds to the ACK/NACK signal reported by the user equipment and does not feed back any ACK/NACK is received.

As mentioned above, the reported ACK/NACK signal may include multiple bits, and may also include one bit. Each bit corresponds to a group of downlink transmission resources that do not feed back any ACK/NACK, and there may be multiple conditions for the downlink transmission resource range represented by the group of downlink transmission resources that do not feed back any ACK/NACK. Therefore, in the embodiments, the reported downlink transmission resource range may further be received, such that the downlink data receiving condition, i.e., specific downlink data that is successfully received and specific downlink data that fails to be received, may be learned more clearly and accurately for the base station to perform more accurate processing.

The step E and the step D may involve two messages and may also involve the same message.

For example, the same message is involved. Following the above example, the user equipment reports the ACK/NACK signal on S13 of the slot 2. The reported ACK/NACK signal includes two bits, and a message structure is "1-(S1-S11); 0-(S1-S11)", representing that the value 1 of the first bit represents that the first set of downlink data sent on S1 to S11 of the slot 1 is successfully received and the value 0 of the second bit represents that the first set of downlink data sent on S1 to S11 of the slot 2 fails to be received and needs to be resent.

The implementation process will be introduced below through some embodiments in detail.

FIG. 3 is a flow chart showing a hybrid automatic repeat feedback control method, according to an exemplary embodiment. The hybrid automatic repeat feedback control method is applied to an access network device such as a base station. As illustrated in FIG. 3, the method includes the following steps 301 to 304.

In the step 301, whether there is an ACK/NACK signal on a time-frequency resource configured by a system and corresponding to the ACK/NACK signal is monitored.

In the step 302, if no ACK/NACK signal is detected, a timer is started.

In the step 303, after the timer expires, a feedback scheduling message is sent to user equipment through downlink control signaling to instruct the user equipment to send the ACK/NACK signal, and the ACK/NACK signal relates to all downlink transmission resources that do not feed back any ACK/NACK.

In the step 304, the ACK/NACK signal reported by the user equipment is received.

Figure 4:
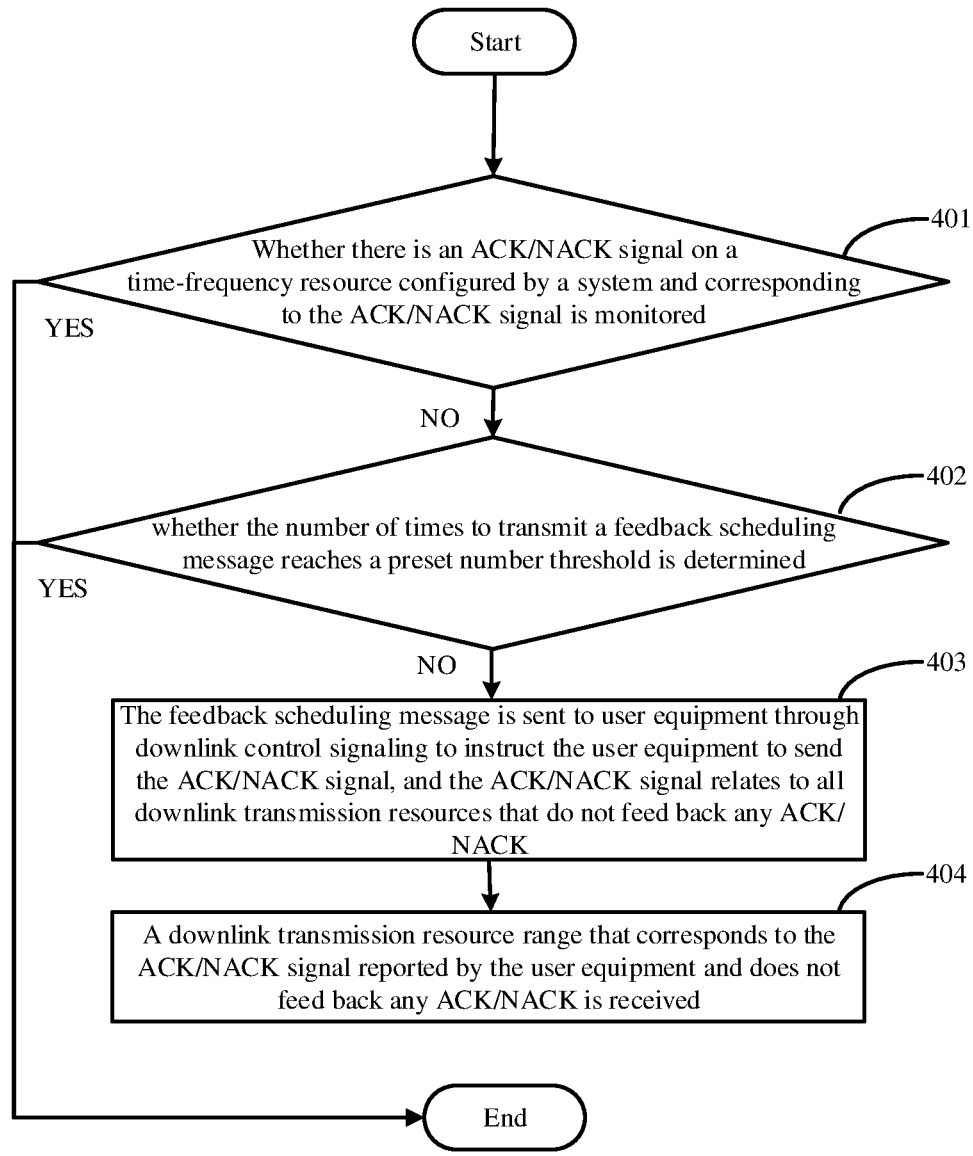
FIG. 4 is a flow chart showing a hybrid automatic repeat feedback control method, according to an exemplary embodiment.

FIG. 4 is a flow chart showing a hybrid automatic repeat feedback control method, according to an exemplary embodiment. The hybrid automatic repeat feedback control method is applied to an access network device such as a base station. As illustrated in FIG. 4, the method includes the following steps 401 to 404.

In the step 401, whether there is an ACK/NACK signal on a time-frequency resource configured by a system and corresponding to the ACK/NACK signal is monitored.

In the step 402, if no ACK/NACK signal is detected, whether the number of times to transmit a feedback scheduling message reaches a preset number threshold is determined, when the preset number threshold is not reached, the step 403 is continued, and when the preset number threshold is reached, the flow may be ended.

In the step 403, the feedback scheduling message is sent to user equipment through downlink control signaling to instruct the user equipment to send the ACK/NACK signal, and the ACK/NACK signal relates to all downlink transmission resources that do not feed back any ACK/NACK.

In the step 404, a downlink transmission resource range that corresponds to the ACK/NACK signal reported by the user equipment and does not feed back any ACK/NACK is received.

An implementation process of the base station side is introduced above, and correspondingly, there are also some improvements made on a user equipment side. An implementation process of the user equipment side will be introduced below.

Figure 5:
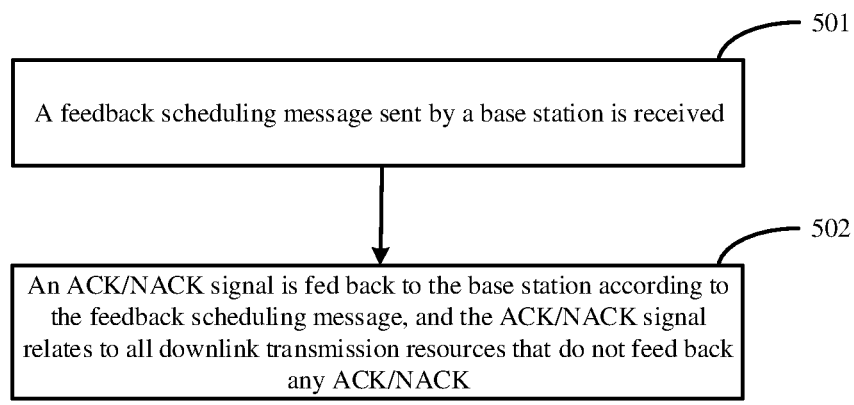
FIG. 5 is a flow chart showing a hybrid automatic repeat feedback control method, according to an exemplary embodiment.

FIG. 5 is a flow chart showing a hybrid automatic repeat feedback control method, according to an exemplary embodiment. The hybrid automatic repeat feedback control method is applied to user equipment. The user equipment may be a mobile phone, a computer, a digital broadcast terminal, a messaging device, a gaming console, a tablet, a medical device, exercise equipment, a personal digital assistant and the like. As illustrated in FIG. 5, the method includes the following steps 501 to 502.

In the step 501, a feedback scheduling message sent by a base station is received.

In the step 502, an ACK/NACK signal is fed back to the base station according to the feedback scheduling message, and the ACK/NACK signal relates to all downlink transmission resources that do not feed back any ACK/NACK.

In the embodiments, the user equipment may receive and parse the feedback scheduling message and feed back the ACK/NACK signal to the base station according to the feedback scheduling message, and the ACK/NACK signal relates to all the downlink transmission resources that do not feed back any ACK/NACK, such that the probability of missing reporting of the ACK/NACK signal is reduced, and a more accurate ACK/NACK signal is provided for the base station.

In an embodiment, before the operation that the feedback scheduling message sent by the base station is received, the method further includes steps F1 to F2.

In the step F1, whether a time-frequency resource configured by a system and corresponding to the ACK/NACK signal is occupied is monitored.

In the step F2, when it is monitored that the time-frequency resource configured by the system and corresponding to the ACK/NACK signal is occupied, the ACK/NACK signal which needs to be sent is recorded.

When it is monitored that the time-frequency resource configured by the system and corresponding to the ACK/NACK signal is not occupied, the flow may be ended, and an implementation solution in the related art is adopted to report the ACK/NACK signal on the time-frequency resource.

In the related art, when it is monitored that the time-frequency resource configured by the system and corresponding to the ACK/NACK signal is occupied, the ACK/NACK is aborted and may not be recorded. In the embodiments, when it is monitored that the time-frequency resource configured by the system and corresponding to the ACK/NACK signal is occupied, the ACK/NACK signal which needs to be sent is recorded. In such a manner, when there is an opportunity of reporting the ACK/NACK signal, the reported ACK/NACK signal may correspond to all the downlink transmission resources that do not feed back any ACK/NACK, and information in the reported ACK/NACK signal is more complete and accurate.

In an embodiment, the step F2 includes step F21.

In the step F21, a corresponding relationship between the ACK/NACK signal which needs to be sent and all the downlink transmission resources that do not feed back any ACK/NACK is recorded.

In the embodiments, when it is monitored that the time-frequency resource configured by the system and corresponding to the ACK/NACK signal is occupied, only the ACK/NACK signal which needs to be sent may be recorded, or the corresponding relationship between the ACK/NACK signal which needs to be sent and all the downlink transmission resources that do not feed back any ACK/NACK may also be recorded to facilitate subsequent reporting of a downlink transmission resource range that does not feed back any ACK/NACK to the base station. Such a record may be stored in a cache.

In an embodiment, the method further includes step G.

In the step G, after the ACK/NACK signal which needs to be sent is recorded, if the feedback scheduling message sent by the base station is not received in a preset time length range, the recorded ACK/NACK signal which needs to be sent is cleared.

In the embodiments, the record may be cleared to save the cache. Clearing the recorded ACK/NACK signal which needs to be sent refers to aborting sending of the recorded ACK/NACK signal. The base station does not receive the ACK/NACK signal and may retransmit corresponding downlink data without downlink data loss.

The user equipment, after sending the ACK/NACK signal, may also clear the recorded ACK/NACK signal which needs to be sent.

In an embodiment, the fed back ACK/NACK signal includes multiple bits, one bit corresponding to a group of downlink transmission resources that do not feed back any ACK/NACK and the multiple bits corresponding to all the downlink transmission resources that do not feed back any ACK/NACK.

In the embodiments, the ACK/NACK signal may include multiple bits, such that the downlink data receiving condition may be reflected more accurately.

Or, in an embodiment, the fed back ACK/NACK signal includes one bit, the bit corresponding to all the downlink transmission resources that do not feed back any ACK/NACK.

The reported ACK/NACK signal includes only one bit, and a value of the bit is obtained by performing calculation on multiple bits corresponding to multiple groups of downlink transmission resources that do not feed back any ACK/NACK. If multiple sets of downlink data are successfully received, the value of the bit is 1, and if at least one set of downlink data is not successfully received, the value of the bit is 0. That is, the reported 1-bit ACK/NACK signal corresponds to all the downlink transmission resources that do not feed back any ACK/NACK. When the value of the bit is 0, the multiple sets of downlink data need to be resent.

The embodiments may be combined with the above embodiment, namely the reported ACK/NACK signal includes multiple bits, a value of at least one bit in the multiple bits being obtained by calculation.

In the embodiments, a calculation manner is adopted, such that the length of the reported ACK/NACK signal may be reduced, and network resources are saved.

In an embodiment, when the fed back ACK/NACK signal includes one bit, the bit is obtained by performing AND-OR calculation on multiple bits, one bit in the multiple bits corresponding to a group of downlink transmission resources that do not feed back any ACK/NACK.

In abovementioned recording, one bit of the ACK/NACK signal may be recorded for each group of downlink transmission resources. Before the ACK/NACK signal is reported, the AND-OR calculation is performed on the multiple bits, corresponding to the multiple groups of downlink transmission resources, of the recorded ACK/NACK signal. An AND-OR calculation result is that: if values of the multiple bits are 1, the value of one bit of the reported ACK/NACK signal is 1, and if the value of at least one of the multiple bits is 1, the value of one bit of the reported ACK/NACK signal is 0.

In an embodiment, the step 501 includes step H.

In the step H, the feedback scheduling message sent by the base station is received through downlink control signaling.

In the embodiments, in case of either specification by the system or configuration by the base station, the user equipment may know about a time-frequency resource where the downlink control signaling is located in advance, and may monitor the time-frequency resource to receive the feedback scheduling message sent by the base station.

In an embodiment, the feedback scheduling message includes no scheduling information.

The step 502 includes step I1.

In the step I1, the ACK/NACK signal is fed back to the base station on a next time-frequency resource configured by the system and corresponding to the ACK/NACK signal.

In the embodiments, the same policy is pre-configured on the base station side and the user equipment side, and when the feedback scheduling message includes no scheduling information, the ACK/NACK signal is fed back to the base station by default on the next time-frequency resource configured by the system and corresponding to the ACK/NACK signal, such that the length of the feedback scheduling message may be reduced.

Or, in an embodiment, the feedback scheduling message includes scheduling information.

The step 502 includes step I2.

In the step I2, the ACK/NACK signal is fed back to the base station on a time-frequency resource indicated by the scheduling information.

In the embodiments, the user equipment may feed back the ACK/NACK signal to the base station on the time-frequency resource indicated by the scheduling information, such that the time-frequency resource for feedback of the ACK/NACK signal may be configured flexibly.

In an embodiment, the method further includes step J.

In the step J, a downlink transmission resource range that corresponds to the ACK/NACK signal and does not feed back any ACK/NACK is fed back to the base station.

In the embodiments, the step J may be combined with the step 502, and the ACK/NACK signal and the corresponding downlink transmission resource range that does not feed back any ACK/NACK are reported, such that more information is provided for the base station, and the base station may implement more accurate subsequent processing.

The implementation process will be introduced below through some embodiments in detail.

Figure 6:
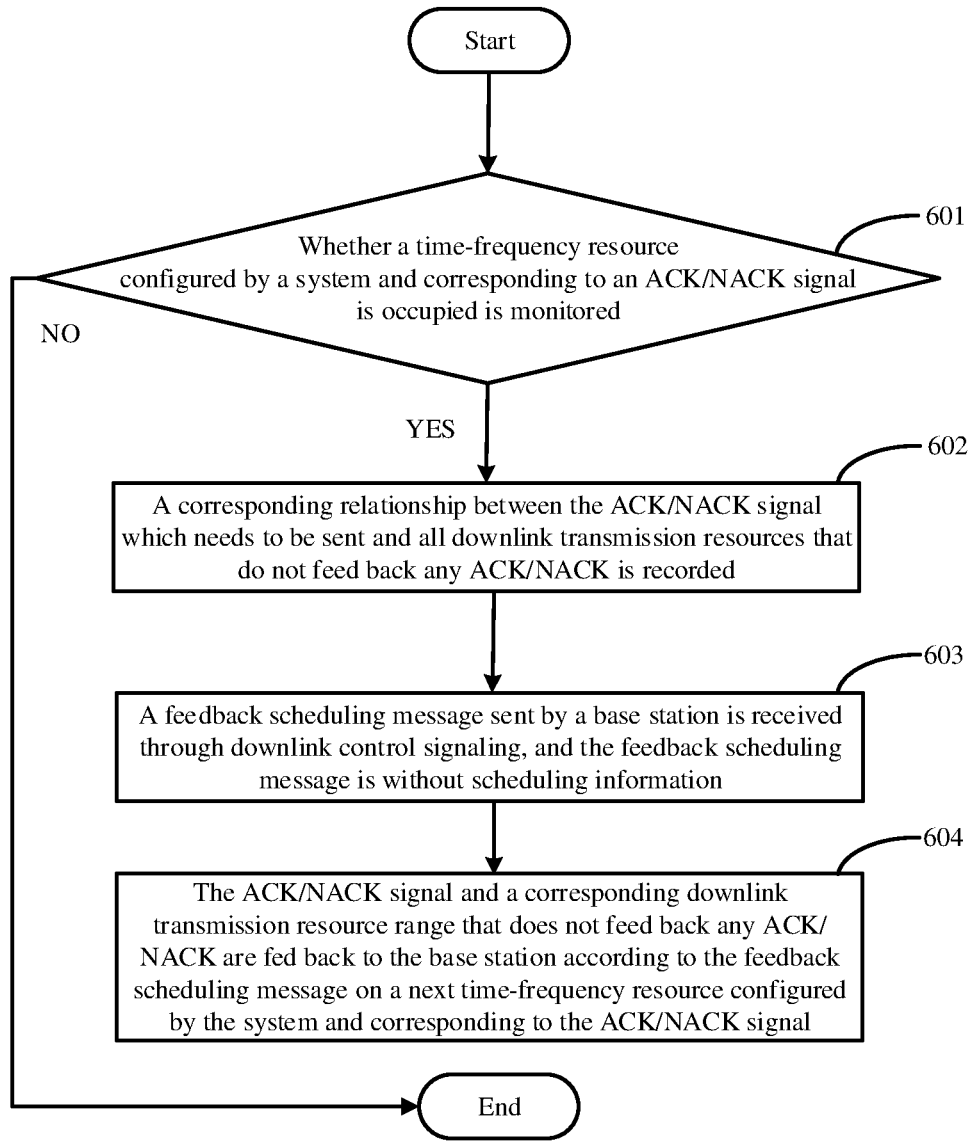
FIG. 6 is a flow chart showing a hybrid automatic repeat feedback control method, according to an exemplary embodiment.

FIG. 6 is a flow chart showing a hybrid automatic repeat feedback control method, according to an exemplary embodiment. The hybrid automatic repeat feedback control method is applied to user equipment. The user equipment may be a mobile phone, a computer, a digital broadcast terminal, a messaging device, a gaming console, a tablet, a medical device, exercise equipment, a personal digital assistant and the like. As illustrated in FIG. 6, the method includes the following steps 601 to 604.

In the step 601, whether a time-frequency resource configured by a system and corresponding to an ACK/NACK signal is occupied is monitored. When it is monitored that the time-frequency resource configured by the system and corresponding to the ACK/NACK signal is occupied, the step 602 is continued. When it is monitored that the time-frequency resource configured by the system and corresponding to the ACK/NACK signal is not occupied, the flow is ended.

In the step 602, a corresponding relationship between the ACK/NACK signal which needs to be sent and all downlink transmission resources that do not feed back any ACK/NACK is recorded.

In the step 603, a feedback scheduling message sent by a base station is received through downlink control signaling, and the feedback scheduling message is without scheduling information.

In the step 604, the ACK/NACK signal and a corresponding downlink transmission resource range that does not feed back any ACK/NACK are fed back to the base station according to the feedback scheduling message on a next time-frequency resource configured by the system and corresponding to the ACK/NACK signal, and the ACK/NACK signal relates to all the downlink transmission resources that do not feed back any ACK/NACK.

Figure 7:
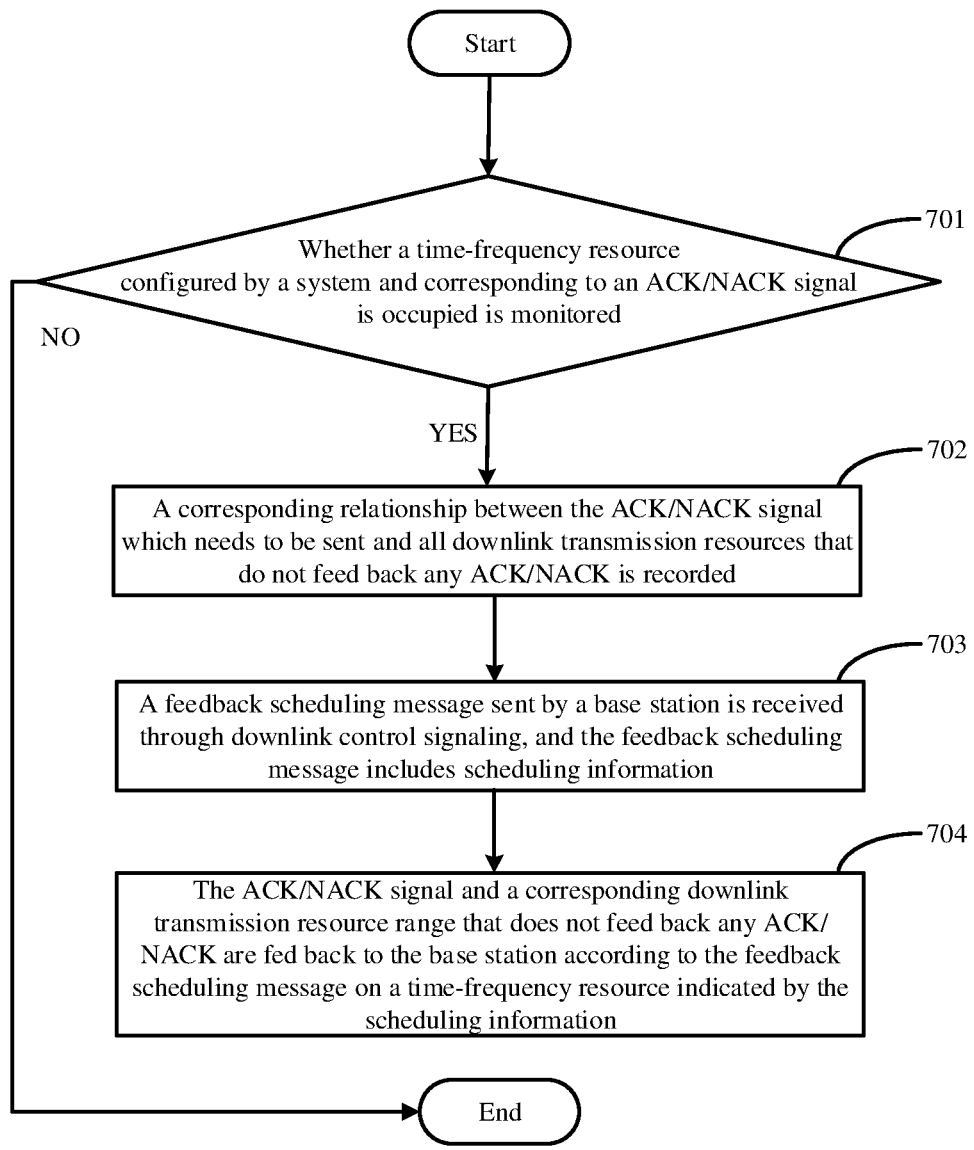
FIG. 7 is a flow chart showing a hybrid automatic repeat feedback control method, according to an exemplary embodiment.

FIG. 7 is a flow chart showing a hybrid automatic repeat feedback control method, according to an exemplary embodiment. The hybrid automatic repeat feedback control method is applied to user equipment. The user equipment may be a mobile phone, a computer, a digital broadcast terminal, a messaging device, a gaming console, a tablet, a medical device, exercise equipment, a personal digital assistant and the like. As illustrated in FIG. 7, the method includes the following steps 701 to 704.

In the step 701, whether a time-frequency resource configured by a system and corresponding to an ACK/NACK signal is occupied is monitored. When it is monitored that the time-frequency resource configured by the system and corresponding to the ACK/NACK signal is occupied, the step 702 is continued. When it is monitored that the time-frequency resource configured by the system and corresponding to the ACK/NACK signal is not occupied, the flow is ended.

In the step 702, a corresponding relationship between the ACK/NACK signal which needs to be sent and all downlink transmission resources that do not feed back any ACK/NACK is recorded.

In the step 703, a feedback scheduling message sent by a base station is received through downlink control signaling, and the feedback scheduling message includes scheduling information.

In the step 704, the ACK/NACK signal and a corresponding downlink transmission resource range that does not feed back any ACK/NACK are fed back to the base station according to the feedback scheduling message on a time-frequency resource indicated by the scheduling information, and the ACK/NACK signal relates to all the downlink transmission resources that do not feed back any ACK/NACK.

The implementation process will be introduced below in combination with the base station side and the user equipment side through an embodiment.

Figure 8:
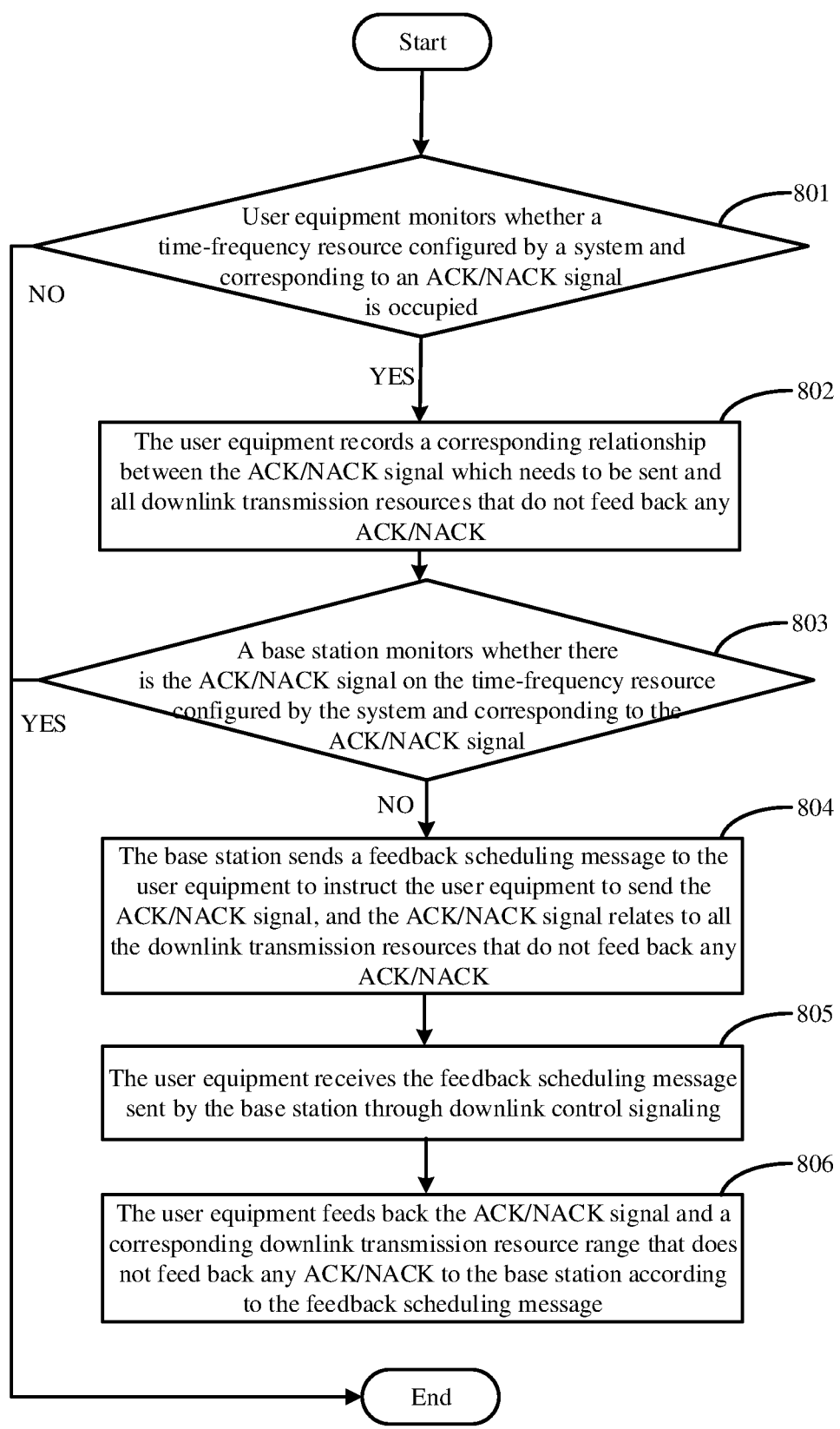
FIG. 8 is a flow chart showing a hybrid automatic repeat feedback control method, according to an exemplary embodiment.

FIG. 8 is a flow chart showing a hybrid automatic repeat feedback control method, according to an exemplary embodiment. The method includes the following steps 801 to 806.

In the step 801, user equipment monitors whether a time-frequency resource configured by a system and corresponding to an ACK/NACK signal is occupied. When it is monitored that the time-frequency resource configured by the system and corresponding to the ACK/NACK signal is occupied, the step 802 is continued. When it is monitored that the time-frequency resource configured by the system and corresponding to the ACK/NACK signal is not occupied, the flow is ended.

In the step 802, the user equipment records a corresponding relationship between the ACK/NACK signal which needs to be sent and all downlink transmission resources that do not feed back any ACK/NACK.

In the step 803, a base station monitors whether there is the ACK/NACK signal on the time-frequency resource configured by the system and corresponding to the ACK/NACK signal.

In the step 804, the base station, if no ACK/NACK signal is detected, sends a feedback scheduling message to the user equipment to instruct the user equipment to send the ACK/NACK signal, and the ACK/NACK signal relates to all the downlink transmission resources that do not feed back any ACK/NACK.

In the step 805, the user equipment receives the feedback scheduling message sent by the base station through downlink control signaling.

In the step 806, the user equipment feeds back the ACK/NACK signal and a corresponding downlink transmission resource range that does not feed back any ACK/NACK to the base station according to the feedback scheduling message, and the ACK/NACK signal relates to all the downlink transmission resources that do not feed back any ACK/NACK.

The above embodiments may be freely combined according to a practical requirement.

The below are device embodiments of the present disclosure, which may be configured to execute the method embodiments of the present disclosure.

Figure 9:
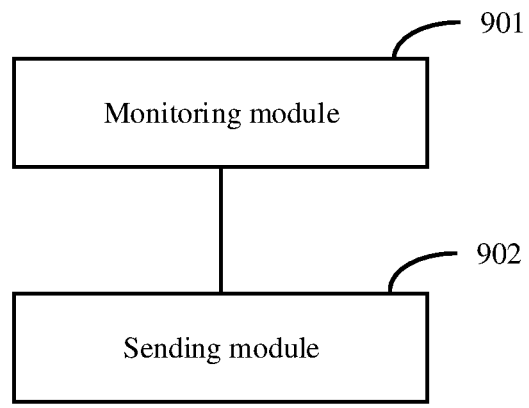
FIG. 9 is a block diagram of a hybrid automatic repeat feedback control device, according to an exemplary embodiment.

FIG. 9 is a block diagram of a hybrid automatic repeat feedback control device, according to an exemplary embodiment. The device may be implemented into part or all of an electronic device through software, hardware or a combination of the two. The hybrid automatic repeat feedback control device is applied to a base station, referring to FIG. 9, and includes a monitoring module 901 and a sending module 902.

The monitoring module 901 is configured to monitor whether there is an ACK/NACK signal on a time-frequency resource configured by a system and corresponding to the ACK/NACK signal.

The sending module 902 is configured to, if no ACK/NACK signal is detected, send a feedback scheduling message to user equipment to instruct the user equipment to send the ACK/NACK signal, and the ACK/NACK signal relates to all downlink transmission resources that do not feed back any ACK/NACK.

In an embodiment, the feedback scheduling message without scheduling information is configured to instruct the user equipment to report the ACK/NACK signal on a next time-frequency resource configured by the system and corresponding to the ACK/NACK signal.

Or, the feedback scheduling message with scheduling information is configured to instruct the user equipment to report the ACK/NACK signal on a time-frequency resource indicated by the scheduling information.

Figure 10:
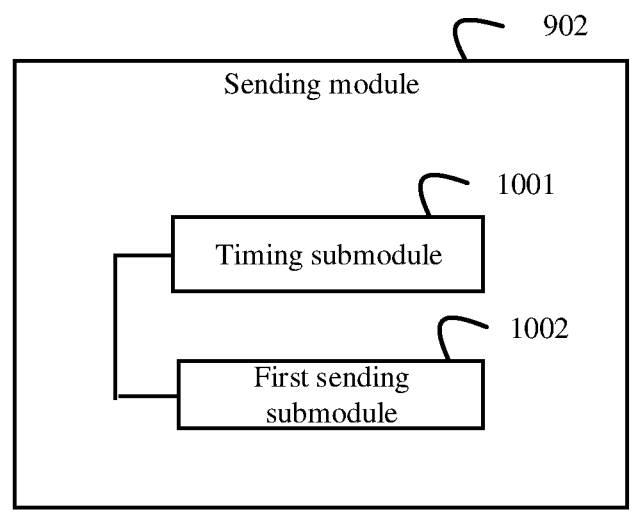
FIG. 10 is a block diagram of a sending module, according to an exemplary embodiment.

In an embodiment, as illustrated in FIG. 10, the sending module 902 includes a timing submodule 1001 and a first sending submodule 1002.

The timing submodule 1001 is configured to, if no ACK/NACK signal is detected, start a timer.

The first sending submodule 1002 is configured to, after the timer expires, send the feedback scheduling message to the user equipment.

Figure 11:
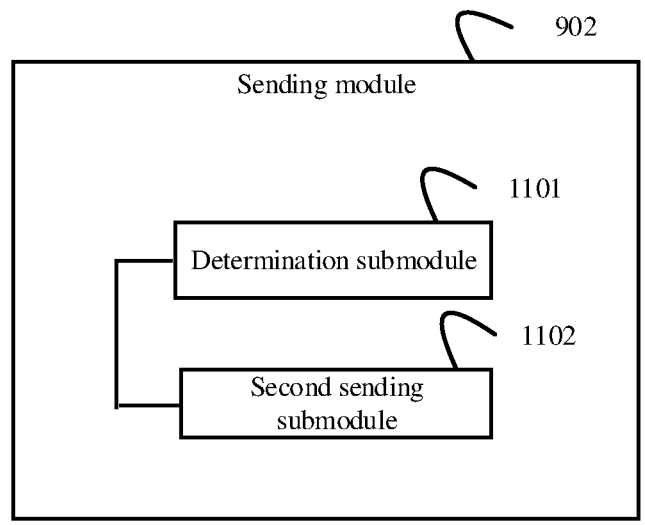
FIG. 11 is a block diagram of a sending module, according to an exemplary embodiment.

In an embodiment, as illustrated in FIG. 11, the sending module 902 includes a determination submodule 1101 and a second sending submodule 1102.

The determination submodule 1101 is configured to, if no ACK/NACK signal is detected, determine whether the number of times to transmit the feedback scheduling message reaches a preset number threshold.

The second sending submodule 1102 is configured to, when the preset number threshold is not reached, send the feedback scheduling message to the user equipment.

Figure 12:
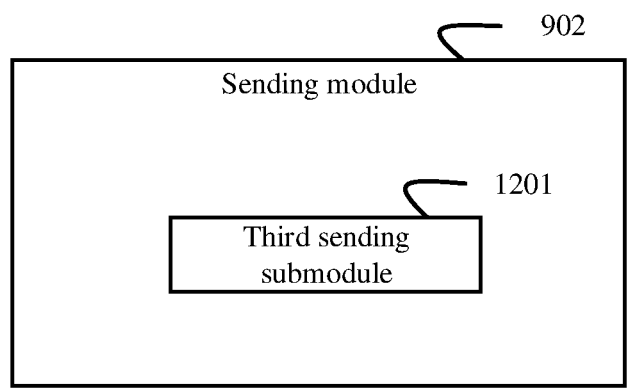
FIG. 12 is a block diagram of a sending module, according to an exemplary embodiment.

In an embodiment, as illustrated in FIG. 12, the sending module 902 includes a third sending submodule 1201.

The third sending submodule 1201 is configured to send the feedback scheduling message to the user equipment through downlink control signaling.

Figure 13:
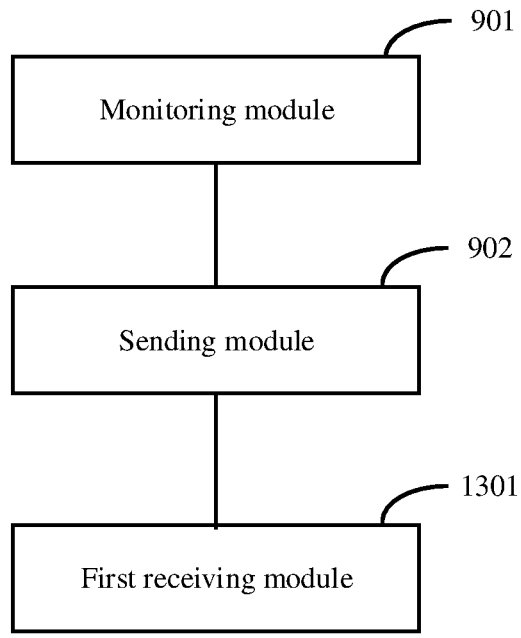
FIG. 13 is a block diagram of a hybrid automatic repeat feedback control device, according to an exemplary embodiment.

In an embodiment, as illustrated in FIG. 13, the device further includes a first receiving module 1301.

The first receiving module 1301 is configured to receive the ACK/NACK signal reported by the user equipment.

In an embodiment, the reported ACK/NACK signal includes multiple bits, one bit corresponding to a group of downlink transmission resources that do not feed back any ACK/NACK and the multiple bits corresponding to all the downlink transmission resources that do not feed back any ACK/NACK.

Or, the reported ACK/NACK signal includes one bit, the bit corresponding to all the downlink transmission resources that do not feed back any ACK/NACK.

Figure 14:
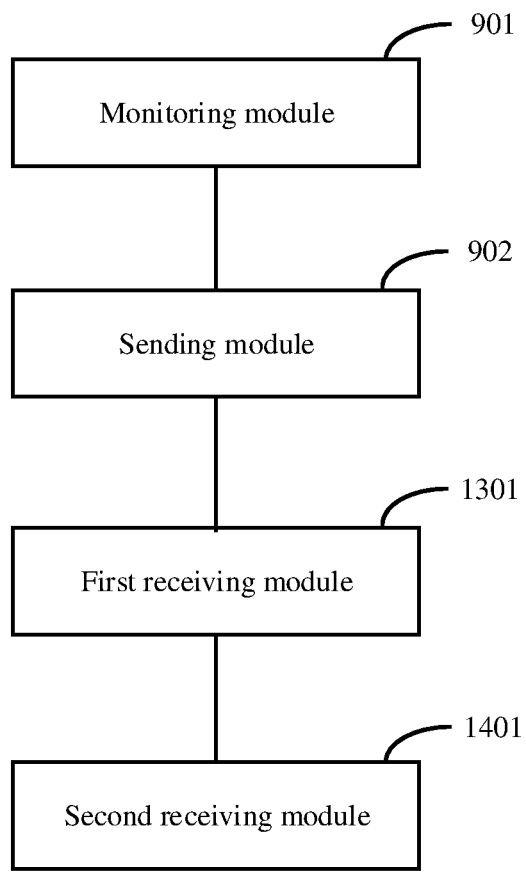
FIG. 14 is a block diagram of a hybrid automatic repeat feedback control device, according to an exemplary embodiment.

In an embodiment, as illustrated in FIG. 14, the device further includes a second receiving module 1401.

The second receiving module 1401 is configured to receive a downlink transmission resource range that corresponds to the ACK/NACK signal reported by the user equipment and does not feed back any ACK/NACK.

Figure 15:
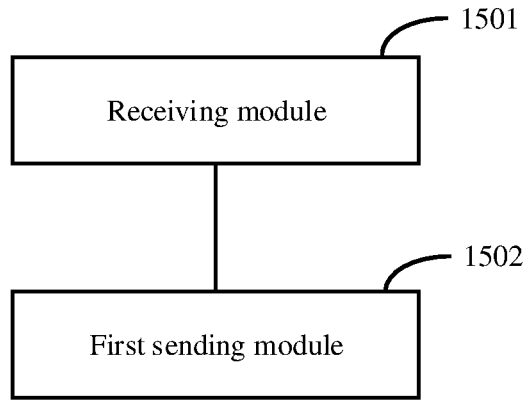
FIG. 15 is a block diagram of a hybrid automatic repeat feedback control device, according to an exemplary embodiment.

FIG. 15 is a block diagram of a hybrid automatic repeat feedback control device, according to an exemplary embodiment. The device may be implemented into part or all of an electronic device through software, hardware or a combination of the two. The hybrid automatic repeat feedback control device is applied to user equipment, referring to FIG. 15, and includes a receiving module 1501 and a first sending module 1502.

The receiving module 1501 is configured to receive a feedback scheduling message sent by a base station.

The first sending module 1502 is configured to feed back an ACK/NACK signal to the base station according to the feedback scheduling message, and the ACK/NACK signal relates to all downlink transmission resources that do not feed back any ACK/NACK.

Figure 16:
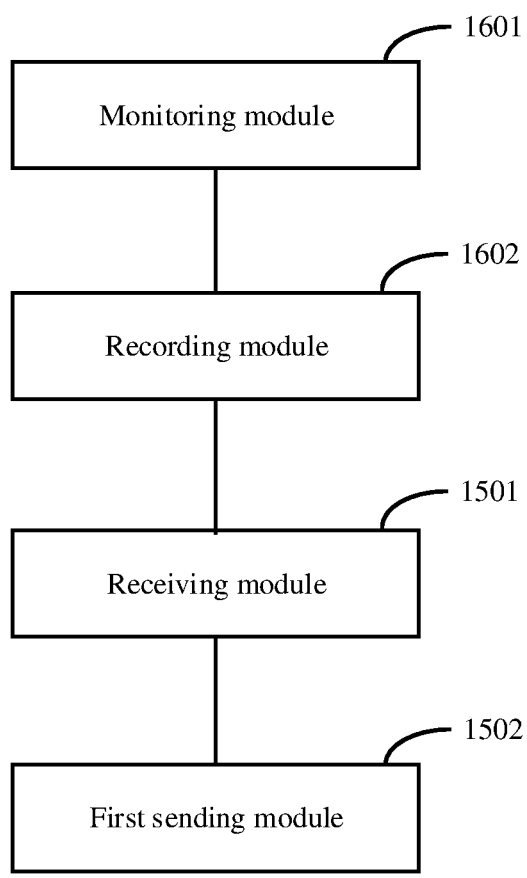
FIG. 16 is a block diagram of a hybrid automatic repeat feedback control device, according to an exemplary embodiment.

In an embodiment, as illustrated in FIG. 16, the device further includes a monitoring module 1601 and a recording module 1602.

The monitoring module 1601 is configured to monitor whether a time-frequency resource configured by a system and corresponding to the ACK/NACK signal is occupied.

The recording module 1602 is configured to, when it is monitored that the time-frequency resource configured by the system and corresponding to the ACK/NACK signal is occupied, record the ACK/NACK signal which needs to be sent.

Figure 17:
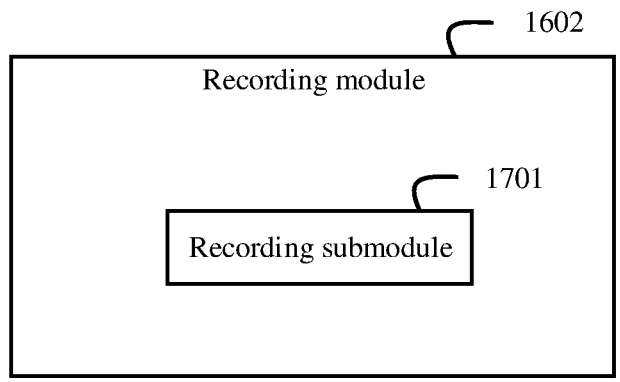
FIG. 17 is a block diagram of a recording module, according to an exemplary embodiment.

In an embodiment, as illustrated in FIG. 17, the recording module 1602 includes a recording submodule 1701.

The recording submodule 1701 is configured to record a corresponding relationship between the ACK/NACK signal which needs to be sent and all the downlink transmission resources that do not feed back any ACK/NACK.

Figure 18:
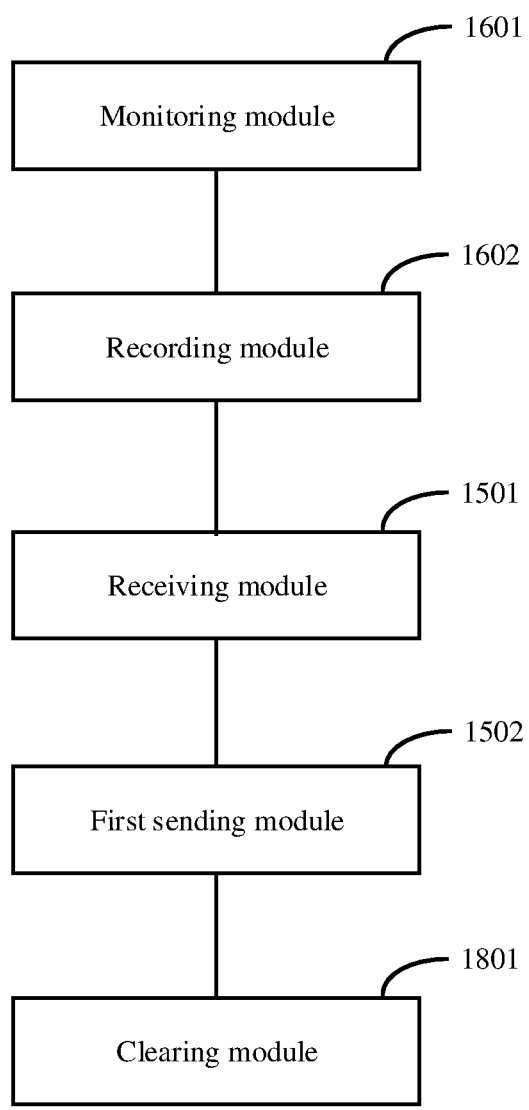
FIG. 18 is a block diagram of a hybrid automatic repeat feedback control device, according to an exemplary embodiment.

In an embodiment, as illustrated in FIG. 18, the device further includes a clearing module 1801.

The clearing module 1801 is configured to, after the ACK/NACK signal which needs to be sent is recorded, if the feedback scheduling message sent by the base station is not received in a preset time length range, clear the recorded ACK/NACK signal which needs to be sent.

In an embodiment, the fed back ACK/NACK signal includes multiple bits, one bit corresponding to a group of downlink transmission resources that do not feed back any ACK/NACK and the multiple bits corresponding to all the downlink transmission resources that do not feed back any ACK/NACK; or the fed back ACK/NACK signal includes one bit, the bit corresponding to all the downlink transmission resources that do not feed back any ACK/NACK.

In an embodiment, when the fed back ACK/NACK signal includes one bit, the bit is obtained by performing AND-OR calculation on multiple bits, one bit in the multiple bits corresponding to a group of downlink transmission resources that do not feed back any ACK/NACK.

Figure 19:
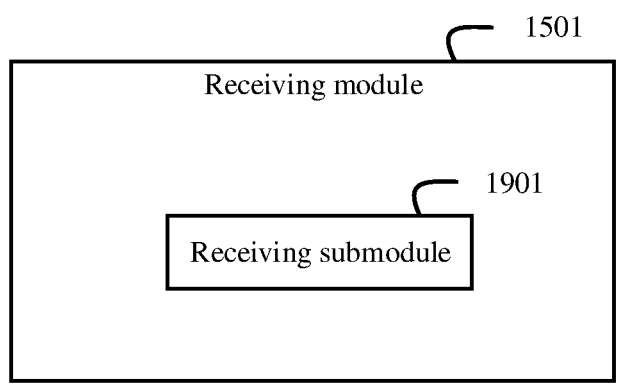
FIG. 19 is a block diagram of a receiving module, according to an exemplary embodiment.

In an embodiment, as illustrated in FIG. 19, the receiving module 1501 includes a receiving submodule 1901.

The receiving submodule 1901 is configured to receive the feedback scheduling message sent by the base station through downlink control signaling.

Figure 20:
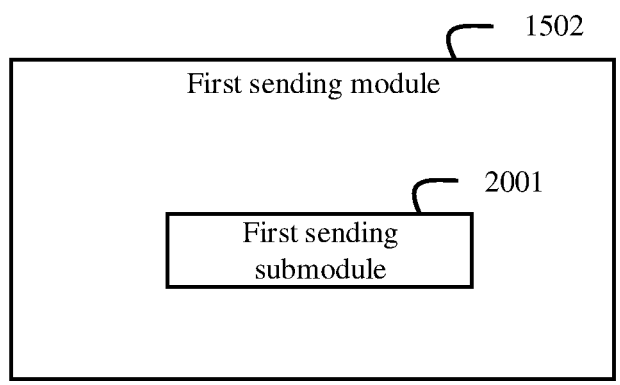
FIG. 20 is a block diagram of a first sending module, according to an exemplary embodiment.

In an embodiment, the feedback scheduling message includes no scheduling information, and as illustrated in FIG. 20, the first sending module 1502 includes a first sending submodule 2001.

The first sending submodule 2001 is configured to feed back the ACK/NACK signal to the base station on a next time-frequency resource configured by the system and corresponding to the ACK/NACK signal.

Figure 21:
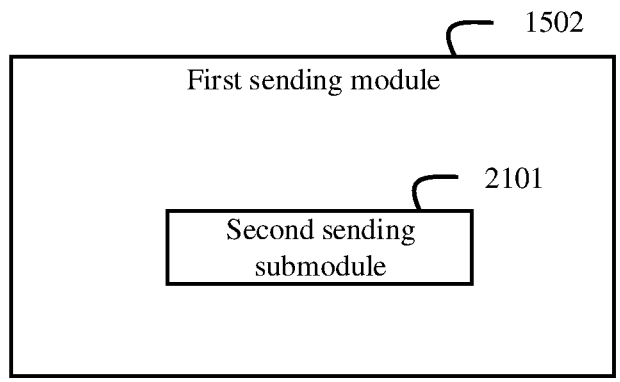
FIG. 21 is a block diagram of a first sending module, according to an exemplary embodiment.

Or, the feedback scheduling message includes scheduling information, and as illustrated in FIG. 21, the first sending module 1502 includes a second sending submodule 2101.

The second sending submodule 2101 is configured to feed back the ACK/NACK signal to the base station on a time-frequency resource indicated by the scheduling information.

Figure 22:
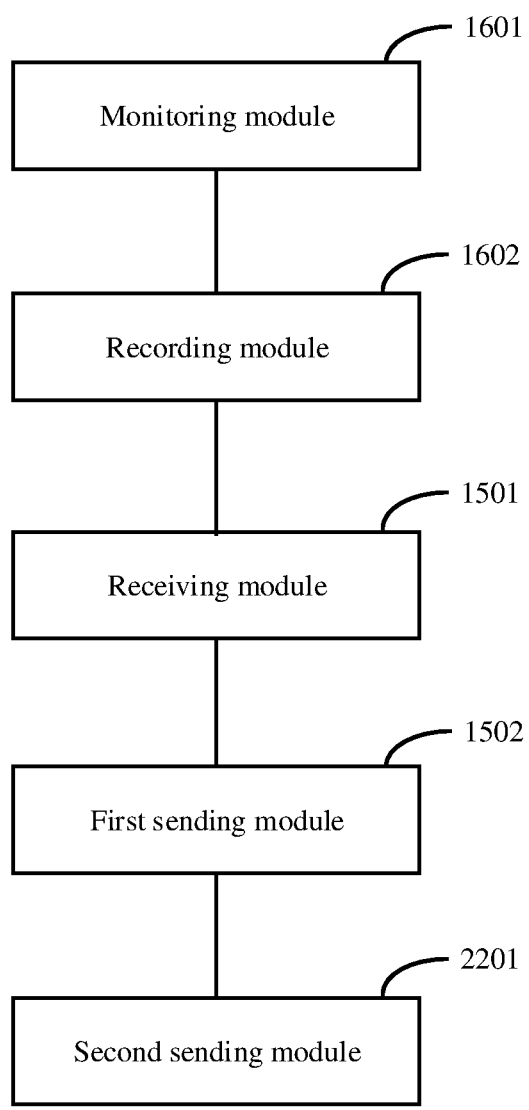
FIG. 22 is a block diagram of a hybrid automatic repeat feedback control device, according to an exemplary embodiment.

In an embodiment, as illustrated in FIG. 22, the device further includes a second sending module 2201.

The second sending module 2201 is configured to feed back a downlink transmission resource range that corresponds to the ACK/NACK signal and does not feed back any ACK/NACK to the base station.

With respect to the devices in any above embodiments, the specific manners for performing operations for individual modules therein have been described in detail in the embodiments regarding the methods, which will not be repeated herein.

Figure 23:
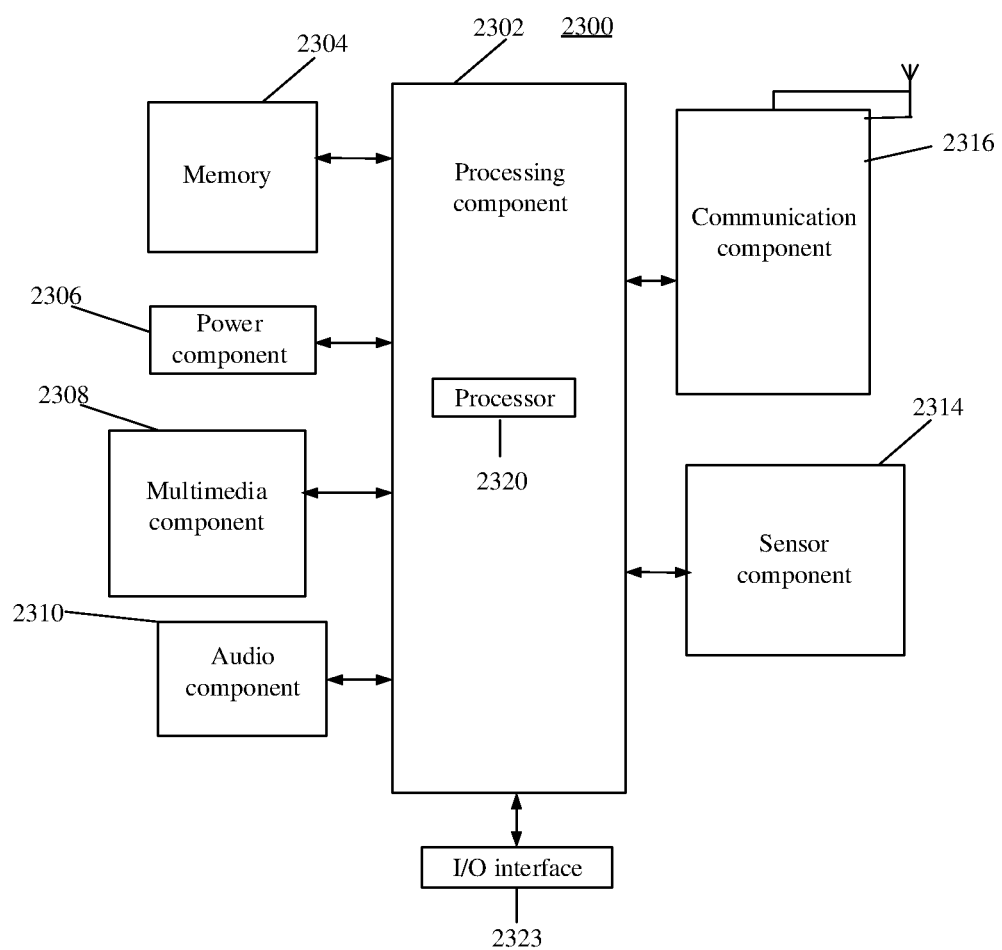
FIG. 23 is a block diagram of a device applied to hybrid automatic repeat feedback control, according to an exemplary embodiment.

FIG. 23 is a block diagram of a device for hybrid automatic repeat feedback control, according to an exemplary embodiment. For example, the device 2300 may be a mobile phone, a computer, a digital broadcast terminal, a messaging device, a gaming console, a tablet, a medical device, exercise equipment, a personal digital assistant, and the like.

The device 2300 may include one or more of the following components: a processing component 2302, a memory 2304, a power component 2306, a multimedia component 2308, an audio component 2310, an input/output (I/O) interface 2323, a sensor component 2314, and a communication component 2316.

The processing component 2302 typically controls overall operations of the device 2300, such as the operations associated with display, telephone calls, data communications, camera operations, and recording operations. The processing component 2302 may include one or more processors 2320 to execute instructions to perform all or part of the steps in the abovementioned method. Moreover, the processing component 2302 may include one or more modules which facilitate interaction between the processing component 2302 and other components. For instance, the processing component 2302 may include a multimedia module to facilitate interaction between the multimedia component 2308 and the processing component 2302.

The memory 2304 is configured to store various types of data to support the operation of the device 2300. Examples of such data include instructions for any applications or methods operated on the device 2300, contact data, phonebook data, messages, pictures, video, etc. The memory 2304 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 2306 provides power for various components of the device 2300. The power component 2306 may include a power management system, one or more power supplies, and other components associated with generation, management and distribution of power for the device 2300.

The multimedia component 2308 includes a screen providing an output interface between the device 2300 and a user. In some embodiments, the screen may include a liquid crystal display (LCD) and a touch panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action, but also detect a period of time and a pressure associated with the touch or swipe action. In some embodiments, the multimedia component 2308 includes a front camera and/or a rear camera. The front camera and/or the rear camera may receive external multimedia data when the device 2300 is in an operation mode, such as a photographing mode or a video mode. Each of the front camera and the rear camera may be a fixed optical lens system or have focusing and optical zooming capabilities.

The audio component 2310 is configured to output and/or input an audio signal. For example, the audio component 2310 includes a microphone (MIC), and the MIC is configured to receive an external audio signal when the device 2300 is in an operation mode, such as a call mode, a recording mode and a voice recognition mode. The received audio signal may further be stored in the memory 2304 or sent through the communication component 2316. In some embodiments, the audio component 2310 further includes a speaker configured to output the audio signal.

The I/O interface 2323 provides an interface between the processing component 2302 and peripheral interface modules, such as a keyboard, a click wheel, buttons, and the like. The buttons may include, but are not limited to: a home button, a volume button, a starting button and a locking button.

The sensor component 2314 includes one or more sensors configured to provide status assessments in various aspects for the device 2300. For instance, the sensor component 2314 may detect an on/off status of the device 2300 and relative positioning of components, such as a display and small keyboard of the device 2300, and the sensor component 2314 may further detect a change in a position of the device 2300 or a component of the device 2300, presence or absence of contact between the user and the device 2300, orientation or acceleration/deceleration of the device 2300 and a change in temperature of the device 2300. The sensor component 2314 may include a proximity sensor configured to detect presence of an object nearby without any physical contact. The sensor component 2314 may also include a light sensor, such as a complementary metal oxide semiconductor (CMOS) or charge coupled device (CCD) image sensor, configured for use in an imaging application. In some embodiments, the sensor component 2314 may also include an acceleration sensor, a gyroscope sensor, a magnetic sensor, a pressure sensor or a temperature sensor.

The communication component 2316 is configured to facilitate wired or wireless communication between the device 2300 and other devices. The device 2300 may access a communication-standard-based wireless network, such as a WiFi network, a 2nd-generation (2G) or 3rd-generation (3G) network or a combination thereof. In an exemplary embodiment, the communication component 2316 receives a broadcast signal or broadcast associated information from an external broadcast management system through a broadcast channel. In an exemplary embodiment, the communication component 2316 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the device 2300 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In an exemplary embodiment, there is also provided a non-transitory computer-readable storage medium including instructions, such as included in the memory 2304, executable by the processor 2320 of the device 2300 for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

In an exemplary embodiment, a hybrid automatic repeat feedback control device is provided, which includes: a processor; and a memory configured to store instructions executable by the processor.

The processor is configured to: receive a feedback scheduling message sent by a base station; and feed back an ACK/NACK signal to the base station according to the feedback scheduling message, and the ACK/NACK signal relates to all downlink transmission resources that do not feed back any ACK/NACK.

The processor may further be configured as follows.

Before receiving the feedback scheduling message sent by the base station, the method further includes: whether a time-frequency resource configured by a system and corresponding to the ACK/NACK signal is occupied is monitored; and when it is monitored that the time-frequency resource configured by the system and corresponding to the ACK/NACK signal is occupied, the ACK/NACK signal which needs to be sent is recorded.

The processor may further be configured as follows.

The operation that the ACK/NACK signal which needs to be sent is recorded includes: a corresponding relationship between the ACK/NACK signal which needs to be sent and all the downlink transmission resources that do not feed back any ACK/NACK is recorded.

The processor may further be configured as follows.

The method further includes: after the ACK/NACK signal which needs to be sent is recorded, if the feedback scheduling message sent by the base station is not received in a preset time length range, the recorded ACK/NACK signal which needs to be sent is cleared.

The processor may further be configured as follows.

The fed back ACK/NACK signal includes multiple bits, one bit corresponding to a group of downlink transmission resources that do not feed back any ACK/NACK and the multiple bits corresponding to all the downlink transmission resources that do not feed back any ACK/NACK; or, the fed back ACK/NACK signal includes one bit, the bit corresponding to all the downlink transmission resources that do not feed back any ACK/NACK.

The processor may further be configured as follows.

When the fed back ACK/NACK signal includes one bit, the bit is obtained by performing AND-OR calculation on multiple bits, one bit in the multiple bits corresponding to a group of downlink transmission resources that do not feed back any ACK/NACK.

The processor may further be configured as follows.

The operation that the feedback scheduling message sent by the base station is received includes: the feedback scheduling message sent by the base station is received through downlink control signaling.

The processor may further be configured as follows.

The feedback scheduling message includes no scheduling information, and the operation that the ACK/NACK signal is fed back to the base station includes: the ACK/NACK signal is fed back to the base station on a next time-frequency resource configured by the system and corresponding to the ACK/NACK signal.

Or, the feedback scheduling message includes scheduling information, and the operation that the ACK/NACK signal is fed back to the base station includes: the ACK/NACK signal is fed back to the base station on a time-frequency resource indicated by the scheduling information.

The processor may further be configured as follows.

The method further includes: a downlink transmission resource range that corresponds to the ACK/NACK signal and does not feed back any ACK/NACK is fed back to the base station.

According to a computer-readable storage medium, instructions in the storage medium are executed by a processor of a device to cause the device to execute a hybrid automatic repeat feedback control method, which includes: a feedback scheduling message sent by a base station is received; and an ACK/NACK signal is fed back to the base station according to the feedback scheduling message, and the ACK/NACK signal relates to all downlink transmission resources that do not feed back any ACK/NACK.

The instructions in the storage medium may further include as follows.

Before the operation that the feedback scheduling message sent by the base station is received, the method further includes: whether a time-frequency resource configured by a system and corresponding to the ACK/NACK signal is occupied is monitored; and when it is monitored that the time-frequency resource configured by the system and corresponding to the ACK/NACK signal is occupied, the ACK/NACK signal which needs to be sent is recorded.

The instructions in the storage medium may further include as follows.

The operation that the ACK/NACK signal which needs to be sent is recorded includes: a corresponding relationship between the ACK/NACK signal which needs to be sent and all the downlink transmission resources that do not feed back any ACK/NACK is recorded.

After the ACK/NACK signal which needs to be sent is recorded, if the feedback scheduling message sent by the base station is not received in a preset time length range, the recorded ACK/NACK signal which needs to be sent is cleared.

The instructions in the storage medium may further include: the fed back ACK/NACK signal includes multiple bits, one bit corresponding to a group of downlink transmission resources that do not feed back any ACK/NACK and the multiple bits corresponding to all the downlink transmission resources that do not feed back any ACK/NACK; or, the fed back ACK/NACK signal includes one bit, the bit corresponding to all the downlink transmission resources that do not feed back any ACK/NACK.

The instructions in the storage medium may further include: when the fed back ACK/NACK signal includes one bit, the bit is obtained by performing AND-OR calculation on multiple bits, one bit in the multiple bits corresponding to a group of downlink transmission resources that do not feed back any ACK/NACK.

The instructions in the storage medium may further include as follows.

The operation that the feedback scheduling message sent by the base station includes: the feedback scheduling message sent by the base station is received through downlink control signaling.

The instructions in the storage medium may further include as follows.

The feedback scheduling message includes no scheduling information, and the operation that the ACK/NACK signal is fed back to the base station includes: the ACK/NACK signal is fed back to the base station on a next time-frequency resource configured by the system and corresponding to the ACK/NACK signal.

Or, the feedback scheduling message includes scheduling information, and the operation that the ACK/NACK signal is fed back to the base station includes: the ACK/NACK signal is fed back to the base station on a time-frequency resource indicated by the scheduling information.

The instructions in the storage medium may further include as follows.

The method further includes: a downlink transmission resource range that corresponds to the ACK/NACK signal and does not feed back any ACK/NACK is fed back to the base station.

Figure 24:
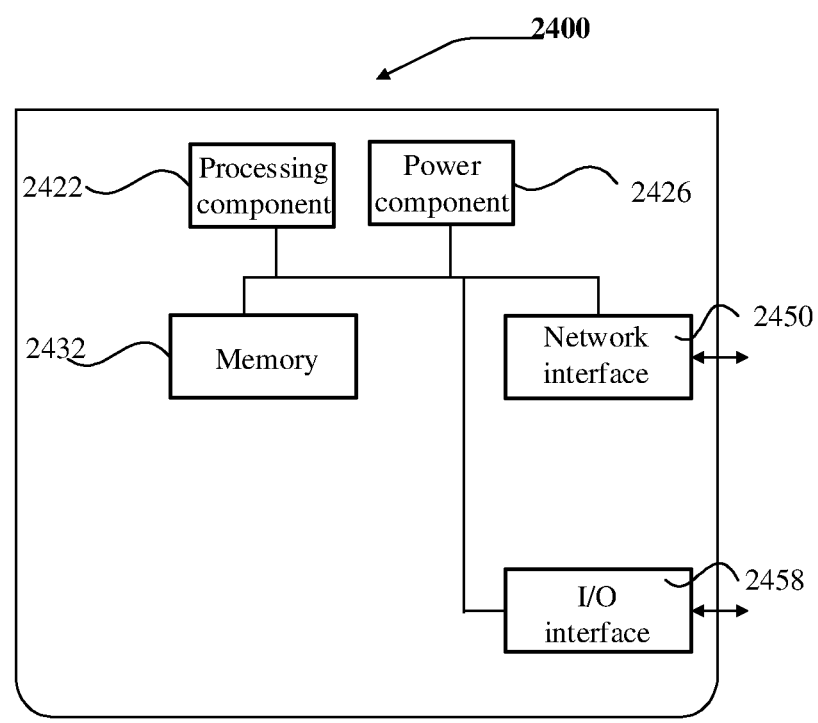
FIG. 24 is a block diagram of a device applied to hybrid automatic repeat feedback control, according to an exemplary embodiment.

FIG. 24 is a block diagram of a device 2400 for data synchronization hybrid automatic repeat feedback control, according to an exemplary embodiment. For example, the device 2400 may be provided as a computer. Referring to FIG. 24, the device 2400 includes a processing component 2422, further including one or more processors, and a memory resource represented by a memory 2432, configured to store instructions executable by the processing component 2422, for example, an application program. The application program stored in the memory 2432 may include one or more than one module of which each corresponds to a group of instructions. In addition, the processing component 2422 is configured to execute the instructions to execute the hybrid automatic repeat feedback control method.

The device 2400 may further include a power component 2426 configured to execute power management of the device 2400, a wired or wireless network interface 2450 configured to connect the device 2400 to a network and an I/O interface 2458. The device 2400 may be operated based on an operating system stored in the memory 2432, for example, Windows Server™, Mac OS X™, Unix™, Linux™, FreeBSD™ or the like.

In an exemplary embodiment, a hybrid automatic repeat feedback control device is provided, which includes: a processor; and a memory configured to store instructions executable by the processor.

The processor is configured to: monitor whether there is an ACK/NACK signal on a time-frequency resource configured by a system and corresponding to the ACK/NACK signal; and if no ACK/NACK signal is detected, send a feedback scheduling message to user equipment to instruct the user equipment to send the ACK/NACK signal. The ACK/NACK signal relates to all downlink transmission resources that do not feed back any ACK/NACK.

The processor may further be configured as follows.

The feedback scheduling message without scheduling information is configured to instruct the user equipment to report the ACK/NACK signal on a next time-frequency resource configured by the system and corresponding to the ACK/NACK signal.

Or, the feedback scheduling message with scheduling information is configured to instruct the user equipment to report the ACK/NACK signal on a time-frequency resource indicated by the scheduling information.

The processor may further be configured as follows.

The operation that the feedback scheduling message is sent to the user equipment if no ACK/NACK signal is detected includes: if no ACK/NACK signal is detected, a timer is started; and after the timer expires, sends the feedback scheduling message to the user equipment.

The processor may further be configured as follows.

The operation that the feedback scheduling message is sent to the user equipment if no ACK/NACK signal is detected includes: if no ACK/NACK signal is detected, whether the number of times to transmit the feedback scheduling message reaches a preset number threshold is determined; and when the preset number threshold is not reached, the feedback scheduling message is sent to the user equipment.

The processor may further be configured as follows.

The operation that the feedback scheduling message is sent to the user equipment includes: the feedback scheduling message is sent to the user equipment through downlink control signaling.

The processor may further be configured as follows.

The method further includes: the ACK/NACK signal reported by the user equipment is received.

The processor may further be configured as follows.

The reported ACK/NACK signal includes multiple bits, one bit corresponding to a group of downlink transmission resources that do not feed back any ACK/NACK and the multiple bits corresponding to all the downlink transmission resources that do not feed back any ACK/NACK; or, the reported ACK/NACK signal includes one bit, the bit corresponding to all the downlink transmission resources that do not feed back any ACK/NACK.

The processor may further be configured as follows.

The method further includes: a downlink transmission resource range that corresponds to the ACK/NACK signal reported by the user equipment and does not feed back any ACK/NACK is received.

According to a computer-readable storage medium, instructions in the storage medium are executed by a processor of a device to cause the device to execute the hybrid automatic repeat feedback control method, which includes: whether there is an ACK/NACK signal on a time-frequency resource configured by a system and corresponding to the ACK/NACK signal is monitored; and if no ACK/NACK signal is detected, a feedback scheduling message is sent to user equipment to instruct the user equipment to send the ACK/NACK signal, and the ACK/NACK signal relates to all downlink transmission resources that do not feed back any ACK/NACK.

The instructions in the storage medium may further include: the feedback scheduling message without scheduling information is configured to instruct the user equipment to report the ACK/NACK signal on a next time-frequency resource configured by the system and corresponding to the ACK/NACK signal; or, the feedback scheduling message with scheduling information is configured to instruct the user equipment to report the ACK/NACK signal on a time-frequency resource indicated by the scheduling information.

The instructions in the storage medium may further include as follows.

The operation that the feedback scheduling message is sent to the user equipment if no ACK/NACK signal is detected includes: if no ACK/NACK signal is detected, a timer is started; and after the timer expires, sends the feedback scheduling message to the user equipment.

The instructions in the storage medium may further include as follows.

The operation that the feedback scheduling message is sent to the user equipment if no ACK/NACK signal is detected includes: if no ACK/NACK signal is detected, whether the number of times to transmit the feedback scheduling message reaches a preset number threshold is determined; and when the preset number threshold is not reached, the feedback scheduling message is sent to the user equipment.

The instructions in the storage medium may further include as follows.

The operation that the feedback scheduling message is sent to the user equipment includes: the feedback scheduling message is sent to the user equipment through downlink control signaling.

The instructions in the storage medium may further include as follows.

The method further includes: the ACK/NACK signal reported by the user equipment is received.

The instructions in the storage medium may further include as follows.

The reported ACK/NACK signal includes multiple bits, one bit corresponding to a group of downlink transmission resources that do not feed back any ACK/NACK and the multiple bits corresponding to all the downlink transmission resources that do not feed back any ACK/NACK; or, the reported ACK/NACK signal includes one bit, the bit corresponding to all the downlink transmission resources that do not feed back any ACK/NACK.

The instructions in the storage medium may further include as follows.

The method further includes: a downlink transmission resource range that corresponds to the ACK/NACK signal reported by the user equipment and does not feed back any ACK/NACK is received.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A hybrid automatic repeat feedback control method, applied to a base station and comprising:
    monitoring whether there is an Acknowledgement (ACK)/Negative Acknowledgement (NACK) signal on a time-frequency resource configured by a system and corresponding to the ACK/NACK signal; and
    sending, in response to no ACK/NACK signal being detected, a feedback scheduling message to user equipment to instruct the user equipment to send the ACK/NACK signal, wherein the ACK/NACK signal relates to all downlink transmission resources for which no ACK/NACK was fed back.

2. The method of claim 1, wherein the feedback scheduling message includes no scheduling information and is configured to instruct the user equipment to report the ACK/NACK signal on a next time-frequency resource configured by the system and corresponding to the ACK/NACK signal; or
    wherein the feedback scheduling message includes scheduling information and is configured to instruct the user equipment to report the ACK/NACK signal on a time-frequency resource indicated by the scheduling information.

3. The method of claim 1, wherein sending the feedback scheduling message to the user equipment in response to no ACK/NACK signal being detected comprises:
    starting, in response to no ACK/NACK signal being detected, a timer; and
    sending, after the timer expires, the feedback scheduling message to the user equipment.

4. The method of claim 1, wherein sending the feedback scheduling message to the user equipment in response to no ACK/NACK signal being detected comprises:
    determining, in response to no ACK/NACK signal being detected, whether a number of times to transmit the feedback scheduling message reaches a preset number threshold; and
    sending, in response to the preset number threshold not being reached, the feedback scheduling message to the user equipment.

5. The method of claim 1, wherein sending the feedback scheduling message to the user equipment comprises:
    sending the feedback scheduling message to the user equipment through downlink control signaling.

6. The method of claim 1, further comprising:
    receiving the ACK/NACK signal reported by the user equipment.

7. The method of claim 6, wherein the reported ACK/NACK signal comprises multiple bits, one bit corresponding to a group of downlink transmission resources for which no ACK/NACK was fed back and the multiple bits corresponding to all the downlink transmission resources for which no ACK/NACK was fed back; or
    wherein the reported ACK/NACK signal comprises one bit, the bit corresponding to all the downlink transmission resources that do not feed back any ACK/NACK for which no ACK/NACK was fed back.

8. The method of claim 6, further comprising:
    receiving a downlink transmission resource range that corresponds to the ACK/NACK signal reported by the user equipment and does not feed back any ACK/NACK.

9. A hybrid automatic repeat feedback control device, comprising:
a processor; and
a memory configured to store instructions executable by the processor;
wherein the processor is configured to perform the hybrid automatic repeat feedback control method of claim 1.

10. A hybrid automatic repeat feedback control method, applied to user equipment and comprising:
receiving a feedback scheduling message sent by a base station; and
feeding back an Acknowledgement (ACK)/Negative Acknowledgement (NACK) signal to the base station according to the feedback scheduling message, wherein the ACK/NACK signal relates to all downlink transmission resources for which no ACK/NACK was fed back.

11. The method of claim 10, before receiving the feedback scheduling message sent by the base station, further comprising:
monitoring whether a time-frequency resource configured by a system and corresponding to the ACK/NACK signal is occupied; and
recording, in response to monitoring that the time-frequency resource configured by the system and corresponding to the ACK/NACK signal is occupied, the ACK/NACK signal which needs to be sent.

12. The method of claim 11, wherein recording the ACK/NACK signal which needs to be sent comprises:
recording a corresponding relationship between the ACK/NACK signal which needs to be sent and all the downlink transmission resources for which no ACK/NACK was fed back.

13. The method of claim 11, further comprising:
clearing, after the ACK/NACK signal which needs to be sent is recorded, in response to the feedback scheduling message sent by the base station not being received in a preset time length range, the recorded ACK/NACK signal which needs to be sent.

14. The method of claim 10, wherein the fed back ACK/NACK signal comprises multiple bits, one bit corresponding to a group of downlink transmission resources for which no ACK/NACK was fed back and the multiple bits corresponding to all the downlink transmission resources that for which no ACK/NACK was fed back; or
wherein the fed back ACK/NACK signal comprises one bit, the bit corresponding to all the downlink transmission resources for which no ACK/NACK was fed back.

15. The method of claim 14, wherein, in response to the fed back ACK/NACK signal comprising one bit, the bit is obtained by performing AND-OR calculation on multiple bits, one bit in the multiple bits corresponding to a group of downlink transmission resources for which no ACK/NACK was fed back.

16. The method of claim 10, wherein receiving the feedback scheduling message sent by the base station comprises:
receiving the feedback scheduling message sent by the base station through downlink control signaling.

17. The method of claim 10, wherein the feedback scheduling message comprises no scheduling information, and
wherein feeding back the ACK/NACK signal to the base station comprises:
feeding back the ACK/NACK signal to the base station on a next time-frequency resource configured by the system and corresponding to the ACK/NACK signal; or
wherein the feedback scheduling message comprises scheduling information, and
wherein feeding back the ACK/NACK signal to the base station comprises:
feeding back the ACK/NACK signal to the base station on a time-frequency resource indicated by the scheduling information.

18. The method of claim 10, further comprising:
feeding back a downlink transmission resource range that corresponds to the ACK/NACK signal and does not feed back any ACK/NACK to the base station.

19. A hybrid automatic repeat feedback control device, comprising:
a processor; and
a memory configured to store instructions executable by the processor;
wherein the processor is configured to:
receive a feedback scheduling message sent by a base station; and
feed back an Acknowledgement (ACK)/Negative Acknowledgement (NACK) signal to the base station according to the feedback scheduling message, wherein the ACK/NACK signal relates to all downlink transmission resources for which no ACK/NACK was fed back.

* * * * *